(12) United States Patent
Li et al.

(10) Patent No.: US 9,279,942 B2
(45) Date of Patent: Mar. 8, 2016

(54) FERRULE FOR OPTICAL FIBER CONNECTOR HAVING A COMPLIANT STRUCTURE FOR CLAMPING ALIGNMENT PINS

(71) Applicant: NANOPRECISION PRODUCTS, INC., El Segundo, CA (US)

(72) Inventors: Shuhe Li, Pasadena, CA (US); Robert Ryan Vallance, Newbury Park, CA (US); Michael K. Barnoski, Pacific Palisades, CA (US); Gregory L. Klotz, La Verne, CA (US)

(73) Assignee: NANOPRECISION PRODUCTS, INC., El Segundo, CA (US)

( * ) Notice: Subject to any disclaimer, the term of this patent is extended or adjusted under 35 U.S.C. 154(b) by 0 days.

(21) Appl. No.: 13/650,119

(22) Filed: Oct. 11, 2012

(65) Prior Publication Data

US 2013/0266268 A1  Oct. 10, 2013

Related U.S. Application Data

(60) Provisional application No. 61/620,945, filed on Apr. 5, 2012.

(51) Int. Cl.
*G02B 6/36* (2006.01)
*G02B 6/38* (2006.01)

(52) U.S. Cl.
CPC ............... *G02B 6/36* (2013.01); *G02B 6/3839* (2013.01); *G02B 6/3882* (2013.01); *G02B 6/3885* (2013.01)

(58) Field of Classification Search
CPC .. G02B 6/3882; G02B 6/4471; G02B 6/3636; G02B 6/364; G02B 6/381; G02B 6/3839

USPC ............... 385/59, 65, 64, 71, 83, 81
See application file for complete search history.

(56) References Cited

U.S. PATENT DOCUMENTS 4,830,456 A * 5/1989 Kakii et al. ............... 385/75
4,973,127 A 11/1990 Cannon, Jr. et al.
(Continued)

FOREIGN PATENT DOCUMENTS

| EP | 0271721 | 6/1988 |
|---|---|---|
| EP | 0800100 | 10/1997 |
| JP | 06-34845 | 2/1994 |

OTHER PUBLICATIONS

International Search Report of Counterpart PCT International Application No. PCT/US2012/059835.

*Primary Examiner* — Ellen Kim
(74) *Attorney, Agent, or Firm* — Liu & Liu

(57) ABSTRACT

A compliant structure clamps the alignment pins to accurately and precisely locate the alignment pins. The compliant structure supports the alignment pins with no clearance. The compliant structure is defined by at least a flexure in the form of a cantilevered structure extending at a side of the ferrule. The cantilevered structure, with or without a complementary support structure, defines a space in which an alignment pin can be supported. The flexure may be defined by one or more slots provided on the body of the ferrule to facilitate bending of the extended cantilevered structure. In another embodiment, the ferrule comprises a ferrule insert having grooves for supporting optical fibers, and a ferrule frame that supports the ferrule insert and alignment pins. The compliant structure is provided on the frame. In a further embodiment, the ferrule insert is provided with optical fiber grooves at its perimeter.

20 Claims, 15 Drawing Sheets

(56) References Cited

U.S. PATENT DOCUMENTS

| | | | |
|---|---|---|---|
| 5,037,179 A * | 8/1991 | Bortolin et al. | 385/54 |
| 5,044,711 A * | 9/1991 | Saito | 385/65 |
| 5,379,361 A * | 1/1995 | Maekawa et al. | 385/65 |
| 5,416,868 A * | 5/1995 | Kakii et al. | 385/80 |
| 5,664,039 A * | 9/1997 | Grinderslev et al. | 385/65 |
| 6,474,877 B1 * | 11/2002 | Shahid | 385/65 |
| 6,817,777 B1 * | 11/2004 | Grabbe | 385/59 |
| 2002/0150349 A1 * | 10/2002 | Shahid | 385/65 |
| 2003/0091297 A1 * | 5/2003 | Hung et al. | 385/83 |
| 2004/0152354 A1 | 8/2004 | Luther et al. | |

* cited by examiner

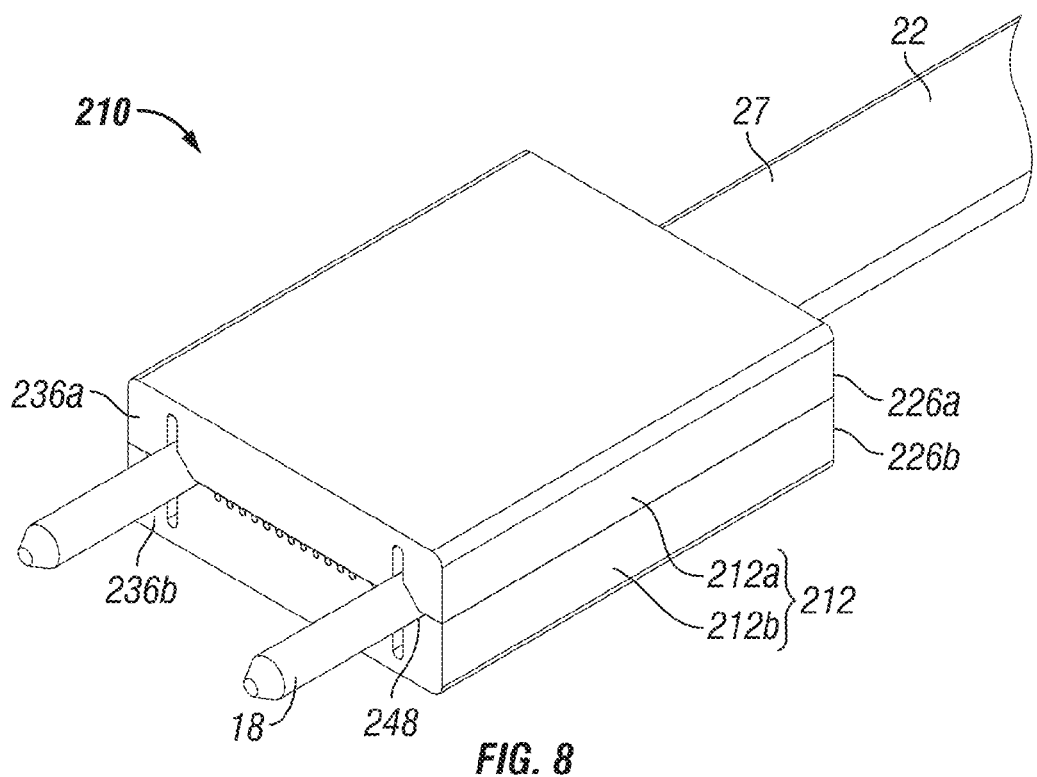
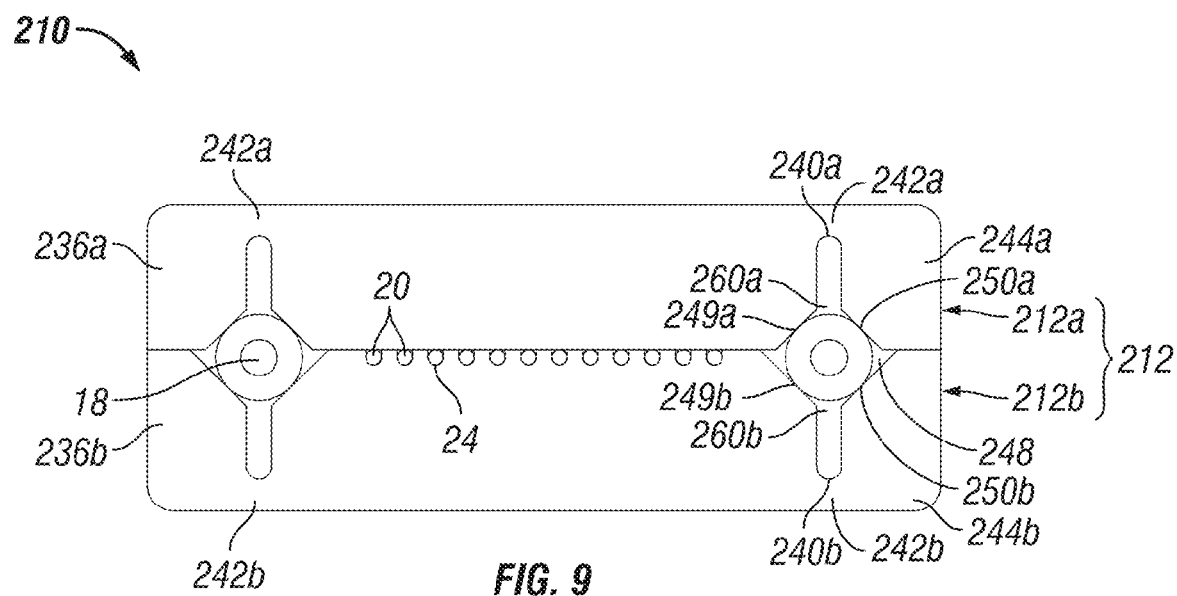

FERRULE FOR OPTICAL FIBER CONNECTOR HAVING A COMPLIANT STRUCTURE FOR CLAMPING ALIGNMENT PINS

PRIORITY CLAIM

This application claims the priority of U.S. Provisional Patent Application No. 61/620,945 filed on Apr. 5, 2012, which is fully incorporated by reference as if fully set forth herein. All publications noted below are fully incorporated by reference as if fully set forth herein.

BACKGROUND OF THE INVENTION

1. Field of the Invention

The present invention relates to optical fiber connectors, in particular ferrules in optical fiber connectors.

2. Description of Related Art

There are many advantages of transmitting light signal via optical fiber waveguides and the use thereof is diverse. Single or multiple fiber waveguides may be used simply for transmitting visible light to a remote location. Complex telephony and data communication systems may transmit multiple specific optical signals. These devices couple fibers in an end-to-end relationship, with the coupling being one source of light loss. Precision alignment of two polished ends of fibers is needed to ensure that overall optical loss in a fiber link is equal or less than the specified optical connector loss budget for a system. For single-mode telecommunication-grade fiber, this typically corresponds to connector fiber alignment tolerances that are less than 1000 nm. This means that in both parallel fiber and single fiber links, operating at multi-gigabit rates, the components applied to align the fibers must be assembled and fabricated with sub-micron precision.

In an optical fiber connection, an optical fiber connector terminates the end of a cable that contains one or multiple fibers, and enables quicker connection and disconnection than splicing. The connectors mechanically couple and align the cores of fibers so that light can pass end-to-end. Better connectors lose very little light due to reflection or misalignment of the fibers. Connectors, in both parallel/multiple fiber and single fiber links, operating at multi-gigabit rates must be assembled with subcomponents fabricated with sub micron precision. As if producing parts with such precision levels were not challenging enough, for the resulting end product to be economical it must be done in a fully automated, very high-speed process.

Current optical fiber connectors have not changed in basic design for many years. The basic connector unit is a connector assembly. FIG. 1 illustrates an example of an optical fiber connector 1400 for a cable 1410 containing optical fibers 1412, which is commercialized by US Conec Ltd. The connector includes an assembly of components consisting of a ferrule 1402, a ferrule housing 1404, a cable jacket or boot 1406, alignment guide pins 408, and other hardware provided within or outside the housing (e.g., cable strain relief, crimp, biasing spring, spacer, etc.). The ferrule 1402 and the terminating end faces of the fibers 1412 are polished. The ferrule 1402 in the optical fiber connector 1400 is spring-loaded to provide an axial bias to press together the polished end faces of the fibers in two connectors in an end-to-end configuration. In most cases, the intent is to establish physical contact between coupled fibers to prevent loss of light. Physical contact avoids a trapped layer of air between two fibers, which increases connector insertion loss and reflection loss. An adaptor, not shown, is required to securely couple the ferrules of two connectors (the ferrule housing 1404 of each connector is plugged into the adaptor).

The optical fiber connector illustrated in FIG. 1 manufactured by US Conec Ltd. is purportedly in accordance with the structure disclosed in U.S. Pat. No. 5,214,730, which is assigned to Nippon Telegraph and Telephone Corporation. As illustrated in the '730 patent, the optical fiber connector receives a optical fiber ribbon cable having a plurality of individual optical fibers and maintains the individual optical fibers in a predetermined relationship. The optical fiber connector can be mated with another optical fiber connector (e.g., using an adaptor) so as to align the plurality of individual optical fibers of one optical fiber connector with the plurality of optical fibers of the other optical fiber connector.

The ferrule 1402 from US Conec Ltd. is generally in the form of a plastic block having a series of over-sized through-holes that provide sufficient clearance for inserting the terminating ends of optical fibers 1412 and alignment pins 1408 into the block. The ferrule 1402 is formed by molding of a plastic polymer that is often reinforced by glass particles. To insert the terminating ends of the multiple optical fibers 1412 through the holes in the ferrule block 1402, the protective jacket and buffer (resin) layers of the optic fiber are stripped off to expose the cladding layer near the terminating ends, and the cladding layer is coated with a layer of epoxy. The terminating ends of the optical fibers are then threaded into the over-sized holes in the ferrule. The ends of the optical fibers 1412 are securely held in the ferrule 1402 upon curing of the epoxy. Similarly, the alignment pins 1408 are retained with epoxy after inserting into the oversized holes in the ferrule 1402 provided for the pins.

The above described ferrule has several significant drawbacks. The injection molded structure inherently does not hold tolerance well. The polymer is not rigid and deforms when loads (forces or moments) are applied to the fiber cable or connector housing. Polymers are also susceptible to creep and thermal expansion/contraction over longer periods of time. The clearance in the over-sized holes in the ferrule further affects tolerance of end-to-end alignment of fibers. The epoxy shrinks upon curing, which leads to bending of the plastic ferrule. Further, epoxy creeps over time, leading to pistoning or retracting of the optical fiber ends (which are pushed against the ends of adjoining fibers) within the holes in the ferrule under the applied axial bias of the spring-load in the connector. This compromises the integrity of the surface contact interface of opposing fiber end faces. These and other deficiencies result in poor resultant tolerance that is more to be desired for modern day optical fiber applications. The above noted deficiencies are further exacerbated for high density optical fiber connectors supporting a two-dimensional array of optical fibers. Fiber alignment becomes even more critical for the two-dimensional array of fibers.

Currently, it is generally accepted that fiber connectors cost too much to manufacture and the reliability and loss characteristics are more to be desired. The tolerance of the fiber connectors must improve, and the cost of producing fiber connectors must decrease if fiber optics is to be the communication media of choice for short haul and very short reach applications. The relatively widespread and ever increasing utilization of optical fibers in communication systems, data processing and other signal transmission systems has created a demand for satisfactory and efficient means of inter-joining fiber terminals.

It is therefore desirable to develop a new optical fiber connector design, and in particular a new ferrule design, which results in low insertion loss and low return loss, which provides ease of use and high reliability with low environmental sensitivity, and which can be fabricated at low cost.

SUMMARY OF THE INVENTION

The present invention provides a ferrule for an optical fiber connector, which overcomes many of the drawbacks of the prior art ferrules and optical fiber connectors. The ferrule in accordance with the present invention provides an optical fiber connector, which results in low insertion loss and low return loss, which provides ease of use and high reliability with low environmental sensitivity, and which can be fabricated at low cost. In accordance with the present invention, a compliant structure is provided on the ferrule, which clamps the alignment pins to accurately and precisely locate the alignment pins for alignment to another complementary optical fiber connector. The compliant structure supports the alignment pins with no clearance, thus not requiring epoxy to fill any clearance between alignment pins and supporting structure. The compliant structure is defined by a structure that is capable of elastic bending (e.g., a flexure defined by a cantilevered structure), as opposed to compressive deformation (e.g., interference fit or press fit between two adjoining surfaces).

In one aspect of the present invention, the compliant structure is defined by at least a flexure in the form of a cantilevered structure extending at a side of the ferrule. The cantilevered structure, with or without a complementary support structure, defines a space in which an alignment pin can be supported. In one embodiment, the flexure is defined by one or more slots provided on the body of the ferrule to facilitate bending of the extended cantilevered structure. The slots may be provided on the interior or exterior of the ferrule body. Two or more cantilevered structures may be provided to define the compliant clamping structure. In one embodiment, the alignment pin is clamped in the space defined by the compliant structure in a 3-point contact or a 4-point contact.

In one embodiment, the ferrule comprises two ferrule halves. At least one of the ferrule halves comprises grooves defined thereon for supporting optical fibers. A compliant structure is provided on the ferrule, which comprises a flexure provided on at least one of the ferrule halves.

In another embodiment, the ferrule comprises a ferrule insert having grooves for supporting optical fibers, and a ferrule frame that supports the ferrule insert and alignment pins. The compliant structure is provided on the frame, which supports alignment pins. In one embodiment, the ferrule insert comprises one or more ferrule plates having optical fiber grooves defined thereon. In one embodiment, the ferrule frame comprises a front frame section and a rear frame section. The front frame section is attached to the front end of the ferrule insert and the rear frame section is attached to the rear end of the ferrule insert to complete the ferrule structure. The alignment pins are inserted into compliant structures provided on the front and rear frame sections. In another embodiment, the ferrule frame may be a single, unitary structure, on which the ferrule insert is supported.

In a further embodiment, the ferrule insert comprises an offset structure provided with optical fiber grooves at its perimeter. In one embodiment, fiber grooves are provided at more than one surface at the perimeter of the offset structure, which can accommodate optical fibers from more than one fiber cable. A compliant structure is provided on the ferrule insert, which supports the alignment pins. The ferrule frame has a section that covers at least the fiber grooves on the ferrule insert. In one embodiment, the ferrule frame comprises extending flat covers covering the grooves provided on the offset structure. In another embodiment, the ferrule frame surrounds the perimeter of the ferrule insert.

In another aspect of the present invention, the inventive ferrules are precision formed by high throughput processes, such as stamping and extrusion.

In one embodiment, the ferrule body is made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass).

The ferrule in accordance with the present invention overcomes many of the deficiencies of the prior art, resulting in an optical fiber connector that results in low insertion loss and low return loss, which provides ease of use and high reliability with low environmental sensitivity, and which can be fabricated at low cost.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIG. 8 illustrates a perspective view of an optical fiber connector in accordance with a yet another embodiment of the present invention.

FIG. 9 is an end view of the optical fiber connector in FIG. 8.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides a ferrule for an optical fiber connector, which overcomes many of the drawbacks of the prior art ferrules and optical fiber connectors. The ferrule in accordance with the present invention provides an optical fiber connector, which results in low insertion loss and low return loss, which provides ease of use and high reliability with low environmental sensitivity, and which can be fabricated at low cost. In accordance with the present invention, a compliant structure is provided on the ferrule, which clamps the alignment pins to accurately and precisely locate the alignment pins for alignment to another complementary optical fiber connector. The compliant structure supports the alignment pins with no clearance, thus not requiring epoxy to fill any clearance between alignment pins and supporting structure. The compliant structure is defined by a structure that is capable of elastic deformation, preferably bending (e.g., a flexure defined by a cantilevered structure), as opposed to compressive or tensile deformation (e.g., interference fit or press fit between two adjoining surfaces). In one aspect of the present invention, the compliant structure is defined by at least a flexure in the form of a cantilevered structure extending at a side of the ferrule. The cantilevered structure, with or without a complementary support structure, defines a space in which an alignment pin can be supported.

Figure 1:
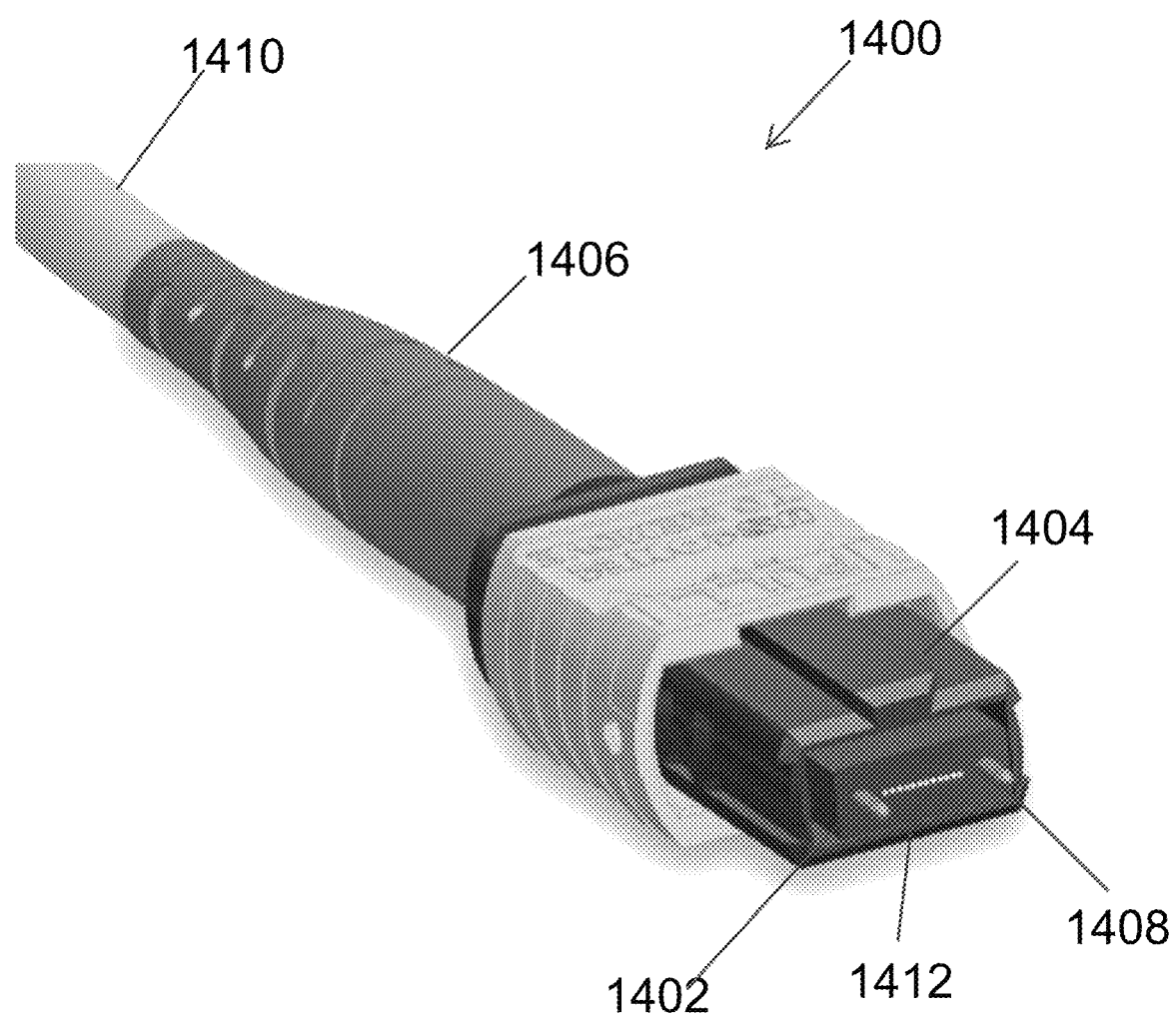
FIG. 1 illustrates a prior art optical fiber connector.
Figure 2:
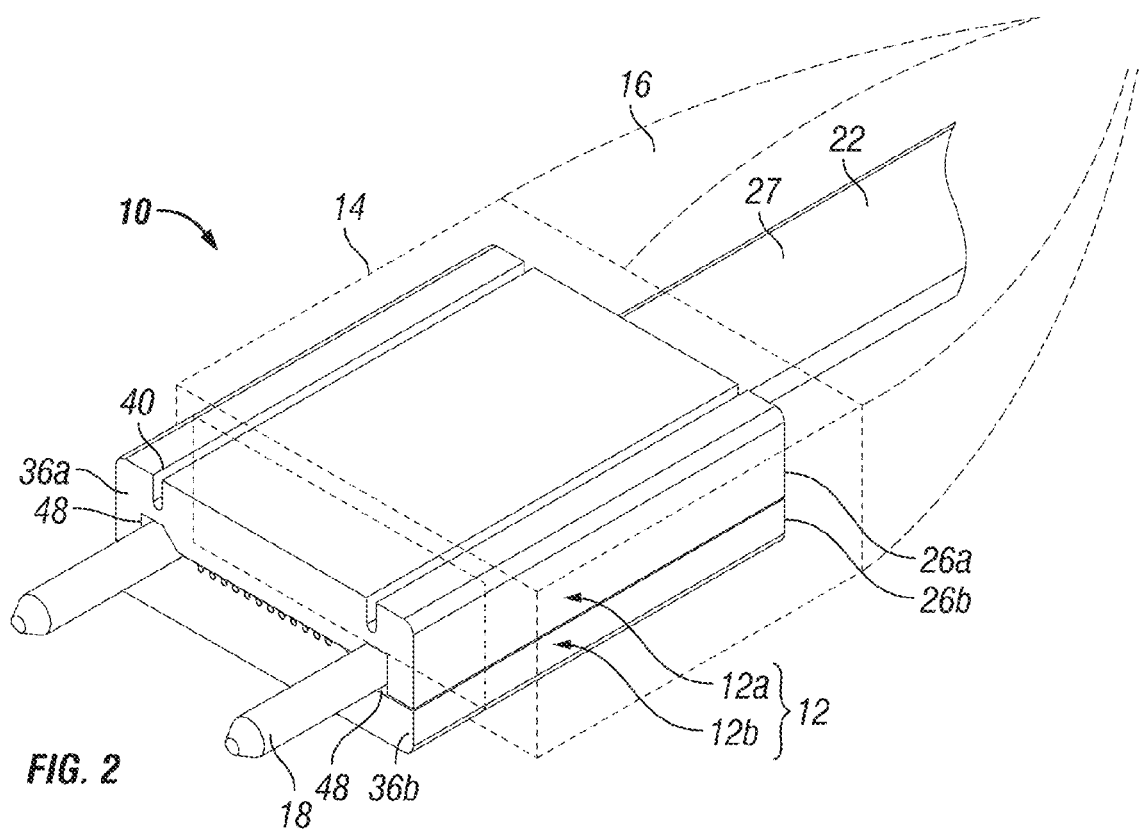
FIG. 2 illustrates a perspective view of an optical fiber connector in accordance with one embodiment of the present invention.
Figure 3:
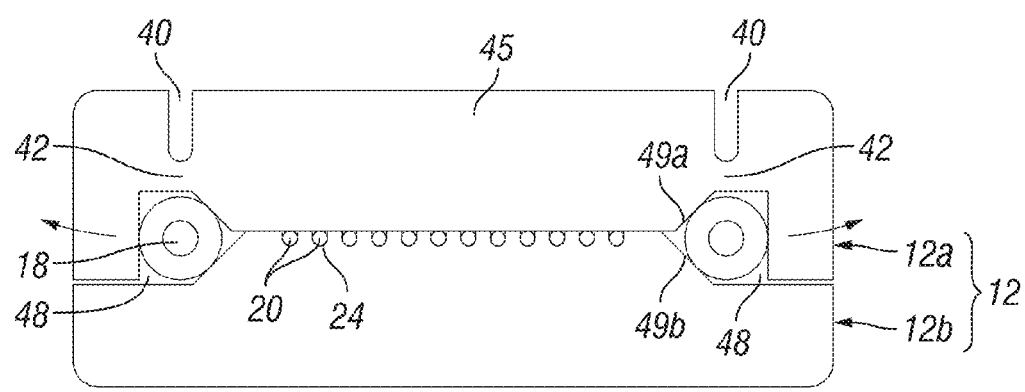
FIG. 3 is an end view of the optical fiber connector in FIG. 2.
Figure 4:
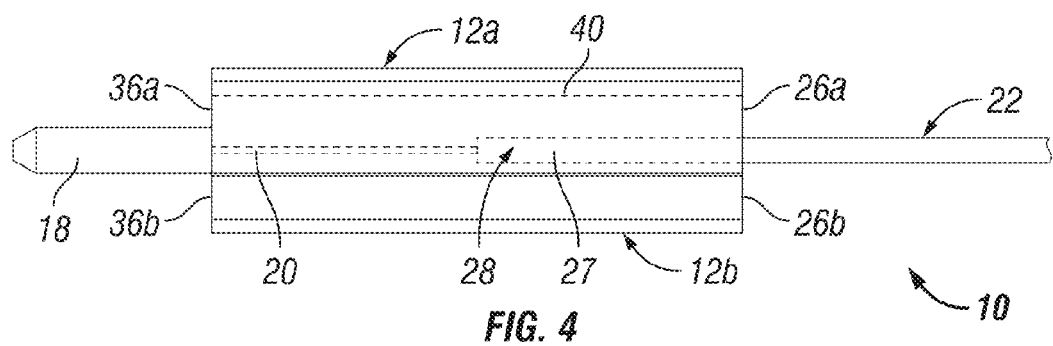
FIG. 4 is a side view of the optical fiber connector in FIG. 2.

FIG. 2 illustrates a perspective view of an optical fiber connector 10 having an assembly of components including a ferrule 12 in accordance with one embodiment of the present invention. The connector 10 further includes a ferrule housing 14 (shown in dotted lines), a cable boot 16 (shown in dotted lines), and alignment guide pins 18. FIG. 2 is a simplified illustration of the optical fiber connector 10. Other than the ferrule 12 that is structured in accordance with the present invention, the other components of the optical fiber assembly 10 may further include those found in the optical fiber assembly shown in FIG. 1 (i.e., the ferrule in accordance with the present invention may be made backward compatible to be used in MTO/MPO optical fiber connectors as offered by US Conec Ltd.). FIGS. 3-4 are various views of the optical fiber connector 10, with the ferrule housing 14 and cable boot 16 omitted from view (for simplicity, further embodiments are discussed herein below and illustrated with the ferrule housing 14 and cable boot omitted from view).

In the illustrated embodiment, the ferrule 12 comprises first and second ferrule halves 12a and 12b. Referring also to FIG. 3, each ferrule halves (12a, 12b) has a generally rectangular plate structure. The ferrule 12b has an open structure that has a row of open grooves 24 precisely formed thereon in a plane for accommodating optical fibers 20 of an optical fiber cable 22. (While a ribbon type fiber cable is illustrated, one can appreciate instead of ribbon fiber cables, the optical fibers may be bundled in the form of rounded fiber cables, without departing from the scope and spirit of the present invention.) The two ferrule halves 12a and 12b are stacked in a mating configuration, with the ferrule halve 12a covering the grooves 24 in the ferrule halve 12b. In the illustrated embodiment, twelve optical fibers 20 are held within a jacket 27 to form an optical ribbon fiber cable 22. The terminating optical fibers 20 of the optical fiber cable 22 are received in the row of longitudinal grooves 24 of the second ferrule halve 12b. The grooves 24 receive the terminating end sections of the optical fibers 20 in their bare form with cladding exposed, without protective buffer and jacket layers. (In the discussion throughout below, in connection with receiving optical fibers in ferrule grooves, it is understood that the terminating end sections of the optical fibers are in their bare form with cladding exposed, without protective buffer and jacket layer.)

Referring also to FIG. 4, the tail sections (26a, 26b) of the ferrule halves 12a and 12b are thinner than the head sections (36a, 36b). The facing sides of the tail sections (26a, 26b) together define a recess 28 there-between, which is sized to receive and clamp the jacket 27 between the ferrule halves 22a and 22b when they are mated together in the configuration illustrated in FIGS. 2 and 4. The jacket 27 of the ribbon fiber cable 22 is fitted within the recess 28, which provides additional room to accommodate the thickness of the jackets (27a and 27b) and the protective buffer and jacket layers on the fibers 20 within the jacket 27. The rear sections (26a, 26b) together provide strain relief on the fiber cable 22. At least the head sections (36a, 36b) of the ferrule halves are maintained in a mating configuration by laser welding, for example. Alternatively, the ferrule may further comprise a collar or sleeve (not shown) to maintain the head sections (36a, 36b) of the ferrule halves (12a, 12b) in a mating configuration.

The configuration of the rows of grooves is more clearly seen from the end view of the ferrule 12 in FIG. 3. In the illustrated embodiment, each groove has a substantially U-shaped cross-section with substantially parallel sides. The head sections 36a and 36b of the ferrule halves 12a and 12b are mated with the head section 36a of the first ferrule halve 12a completely covering the opposing groove openings in the head section 36b of the second ferrule halve 12b.

The depth of the grooves 24 is sized to completely receive the optical fibers 20. In the illustrated embodiment, the depth of the grooves is at least D (e.g., 125 µm), the diameter of the bare section of the optical fibers, with cladding exposed, without protective buffer and jacket layers, as referenced throughout herein. With the depth of the grooves being substantially D, the flat underside of the head section 36a of the first ferrule halve 20a and the opposing grooves 24 together define a space that precisely positions the optical fibers 20.

The width of the longitudinal opening defined between the walls along at least a section of the grooves is slightly narrower than the diameter of the bare optical fibers to create a tight fit (e.g., an interference fit of 1 µm) with respect to the bare fibers (bare sections with cladding exposed, without protective buffer and jacket layers), which allows the end section of an optical fiber 20 to be inserted laterally into the longitudinal opening of groove, but which snuggly retains the optical fiber in the groove 24. The grooves 24 and the width of the longitudinal groove openings are shaped and sized to retain the fibers without any clearance to allow for movement of the fibers 24 relative to the grooves. The grooves 24 may have a rounded bottom to conform to the external shape of the optical fiber (as illustrated), or a flat bottom or a v-groove (thus resulting in spaces between the fiber and the wall of the groove, which may be filled with an additional material such as epoxy for encapsulation purpose, to prevent the entrapment of particles, especially during mechanical polishing of the ferrule end face). The rounded bottom is preferable since it increases the contact area with the fiber and provides more uniform elastic stress within the fiber. The use of a groove with an interference fit contrasts with that of the molded ferrule as shown in FIG. 1, which has a hole that is toleranced to be larger than the diameter of the optical fiber. Consequently, the oversized hole does not govern the position of the optical fiber in the prior art.

Given that the optical fibers 20 are completely retained in the grooves 24, the optical fibers 20 are positioned with precision between the ferrule halves (12a, 12b) by the grooves 24a. The position and orientation of the optical fibers 20 is set by the location and parallelism of the grooves 24. Accordingly, the relative locations (e.g., spacing) of the optical fibers 20 in the ferrule halves (12a, 12b) are precisely maintained within the ferrule, e.g., for alignment to fibers in an opposing optical fiber connector (which has a female structure to receive the alignment pins 18). No complementary ferrule would be required to securely and precisely position the fibers within the optical fiber connector, as such a complementary ferrule halve do not serve any alignment function or effective support to position the fibers 20 in the ferrule halve 12b. However, by providing the top ferrule halve 12a, it serves as a cover for the grooves 24 to prevent accidental dislodgment of the optical fibers 20.

In accordance with the present invention, a compliant structure is provided on the ferrule 12 for precisely locating the alignment pins 18 with respect to the fiber grooves 24. The compliant structure comprises a flexure provided on at least one of the ferrule halves (12a, 12b). In one embodiment, the flexure is defined by one or more slots provided on the body of the ferrule to facilitate bending of the extended cantilevered structure. The slots may be provided on the interior or exterior of the ferrule body.

FIGS. 2-3 illustrate slots provided on the exterior of the ferrule 12. In particular, near each lateral side 44 of the top ferrule halve 12a, a longitudinal narrow slot 40 is provided at the top side of the ferrule halve 12a, which extends from the head section 36a to the tail section 26a. In the end view of FIG. 3, the slots 40 are vertical to the top exterior surface of the ferrule halve 12a. The slot 40 reduces the thickness of the top ferrule halve 12a, such that the side portion 44 extends from the base portion 45 of the first ferrule halve 12a via a cantilever link 42 (i.e., the side portions 44 are cantilevered structures with respect to the base portion 45). A beveled surface 49a is provided in the first ferrule halve 12a facing towards the side portion 44, and a beveled surface 49b is provided in the second ferrule halve 12b facing towards the side portion 44. The side portion 44, the beveled surface 49a and the beveled surface 49b together define a space 48 for precisely locating an alignment pin 18 with respect to the optical fibers 20 (i.e., resulting in a 3-point contact). Upon insertion of an alignment pin 18 in the space 48, the cantilever link 42 elastically deforms (flexes) to allow the side portion 44 to displace slightly outwards away from the base portion 45, thereby providing an inward bias to clamp the alignment pins 18 against the beveled surfaces of the ferrule halves.

Given that the beveled surfaces 49a and 49b are closest to the fiber grooves 24, these beveled surfaces are essentially reference planes that can be precisely formed, while the cantilevered side portions 44 are allowed certain flexibility in movement without affecting the precise reference planes. In another aspect of the present invention, the fiber grooves of the above-disclosed embodiment are precision formed by high throughput processes, such as stamping and extrusion. The surface structures of the ferrule components (i.e., the ferrules halves 12a and 12b) lend themselves to forming using such high throughput processes. A precision stamping process and apparatus has been disclosed in U.S. Pat. No. 7,343,770, which was commonly assigned to the assignee of the present invention. This patent is fully incorporated by reference as if fully set forth herein. The process and stamping apparatus disclosed therein may be adapted to precision stamping the ferrules of the present invention.

In one embodiment, the ferrule body is made of a metal material, which may be chosen to have good thermal dimensional stability (e.g., Invar).

Figure 5:
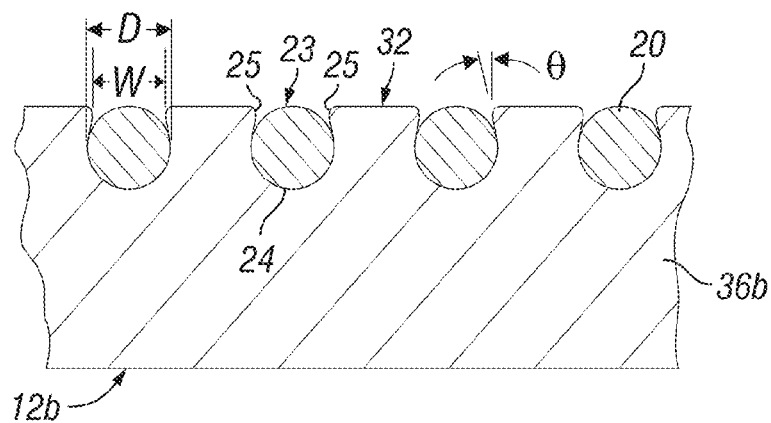
FIG. 5 is a sectional view of a portion of the lower ferrule halve, in accordance with another embodiment of the present invention.

In another embodiment of the present invention, the second ferrule halve 12b has an open structure with precision groove clamping features formed thereon, which can securely hold optical fibers without the need for epoxy or a complementary precision part. FIG. 5 illustrates a section of the grooves 24 in the head section 36b of the second ferrule halve 12b.

The grooves 24b are structured to securely retain the fibers 20 (bare sections with cladding exposed, without protective buffer and jacket layers) by an opening that clamps the fibers 20, e.g., by interference fit (or press fit). The interference fit assures that the fibers 20 are clamped in place and consequently the position and orientation of the fibers is set by the location and parallelism of the grooves 24. The use of an interference fit contrasts with that of the molded ferrule as shown in FIG. 1, which has a hole that is toleranced to be larger than the diameter of the optical fiber. Consequently, the oversized hole does not govern the position of the optical fiber.

In the embodiment illustrated in FIG. 5, the width W of the longitudinal opening 23 of the grooves 24 is made slightly narrower than the diameter of the optical fibers 20. In particular, the opening 23 is defined by lips 25 formed at the opposing longitudinal edges of the longitudinal opening 23. The width W of the longitudinal openings 23 is slightly undersized to allow the terminating end section of the optical fibers to be inserted laterally into the longitudinal openings 23 of the grooves with an interference fit. The magnitude of interference can be set by the manufacturing process so that loading the fiber into the groove causes only elastic deformation or minor plastic deformation in the lip. The grooves should not be plastically deformed; otherwise it will affect the accuracy of the fiber locations.

Specifically, to attach the fibers 20 to the head section 36b of the ferrule 12b, the terminating end section of the fibers 20 are pressed lengthwise into the grooves 24 through the longitudinal openings 23 with a snap action (i.e., not in the axial direction of the grooves), with the tip of the fibers 20 slightly protruding beyond the end face of the head section 36b. Further, the width W of the longitudinal openings 23 and the grooves 24 are sized and shaped to snuggly retain the section of optical fibers 20 in the grooves 24 without providing any clearance for axial and lateral movements of the end face of the fibers relative to the grooves to ensure tight tolerance for optical coupling between end faces of two adjoining fibers. No epoxy would be required for retaining the bare fiber sections in the grooves given the interference along the mating surfaces between the fibers 20 and the grooves 24.

The embodiment shown in FIG. 5 illustrates the cross-sectional shape of the grooves 24 generally conforming to the body of the fibers 20. The fiber 20 is securely "clamped" within the groove 24, with the lips 25 pressing on the top of the fiber 20 against the bottom and other parts of the groove 24. In the illustrated embodiment, the wall of the fiber 20 is shown to press against the entire wall of the groove 24, except near the opening 23. This provides a substantially uniform pressure on substantially the entire circumference of the fiber, which has less effect on the optical signals transmitted through the fiber 20 due to stress-induced changes in fiber or core indices of refraction. However, it is well within the scope and spirit of the present invention to structure the grooves in the ferrule with different cross-sections that would still provide adequate interference fit to securely retain the fibers 20 in the grooves 24. For example, the grooves may have a flat or curved bottom, curved sidewalls, or flat sidewalls perpendicular or at a slight divergent angle to the flat bottom (e.g., a v-bottom), and inwardly directing lips to define the longitudinal opening of the groove. These groove configurations would result in certain spaces between the curved fiber walls and the flat or curved sidewalls of the groove, but the clamping action by the lips 25 and/or vertical walls of the grooves against the fiber nonetheless would not provide any clearance to allow for movement of the fibers within the groove. The empty spaces may be filled with an additional material such as epoxy for encapsulation purpose, to prevent the entrapment of particles, especially during mechanical polishing of the ferrule end face.

Given that the fiber 20 is completely retained in the groove 24, and the profile of the groove such as lips 25 and the bottom of the groove dictate the location of the fiber 20 within the groove, the fiber 20 is positioned with precision in the ferrule by the groove. Accordingly, the relative locations (e.g., spacing) of the fibers 20 in the ferrule halve 12b are precisely maintained within the ferrule, e.g., for alignment to fibers in an opposing optical fiber connector (which has a female structure to receive the alignment pins 18).

As an example and not limitation, in one embodiment, for optical fibers 20b made of silica and having a diameter of 125 μm, in a ferrule made of kovar (54% Fe, 29% Ni, 17% Co) material, the length of the grooves 24b may be 1 to 3 mm, the diameter or width (i.e., the maximum lateral dimension D) of the grooves 24b is 0.124 mm, and the width W of the longitudinal openings 23 is 105 μm. The sidewalls of the groove 23 tilt inward towards the opening 23 at an angle θ of about 5 to 20 degrees with respect to the vertical tangent to the fiber 20b. The interference provided is about 1 μm, appropriate for the silica and kovar material. The silica glass is very high strength in compression, so it will withstand high contact pressures from the interference fit.

For a ferrule having the groove clamping structure in accordance with FIG. 5, no complementary ferrule would be required to securely and precisely position the fibers within the optical fiber connector. Even though complementary ferrule halves do not serve any alignment function or effective support to position the fibers 20b in the ferrule halve 12b, and vice versa, however, by providing two ferrule halves 12a and 12b each having the above groove clamping structure, the ferrule halves 12a and 12b together form a ferrule 12 that accommodates a high fiber density.

It can be appreciated from the foregoing that open channels or grooves can be more easily and precisely formed, compared to forming through-holes in a plastic ferrule block practiced in the prior art, such as the connector shown in FIG. 1. In one embodiment, the grooves are initially formed (e.g., by precision stamping), followed by narrowing of the openings of the grooves, for example, by stamping or punching the top surface of the ferrule body to push the material at the two opposing edges of the opening into the opening in the groove to form a lip, or laser machining to melt the material at the corners of the opening to flow into the opening of the groove to form a lip. In another embodiment, the clamping grooves may be precision formed by extrusion. Further information on the high throughput forming of the clamping grooves shown in FIG. 5 has been disclosed in U.S. patent application Ser. No. 13/440,970, filed Apr. 5, 2012, which was commonly assigned to the assignee of the present invention. This application is fully incorporated by reference as if fully set forth herein.

Figure 6:
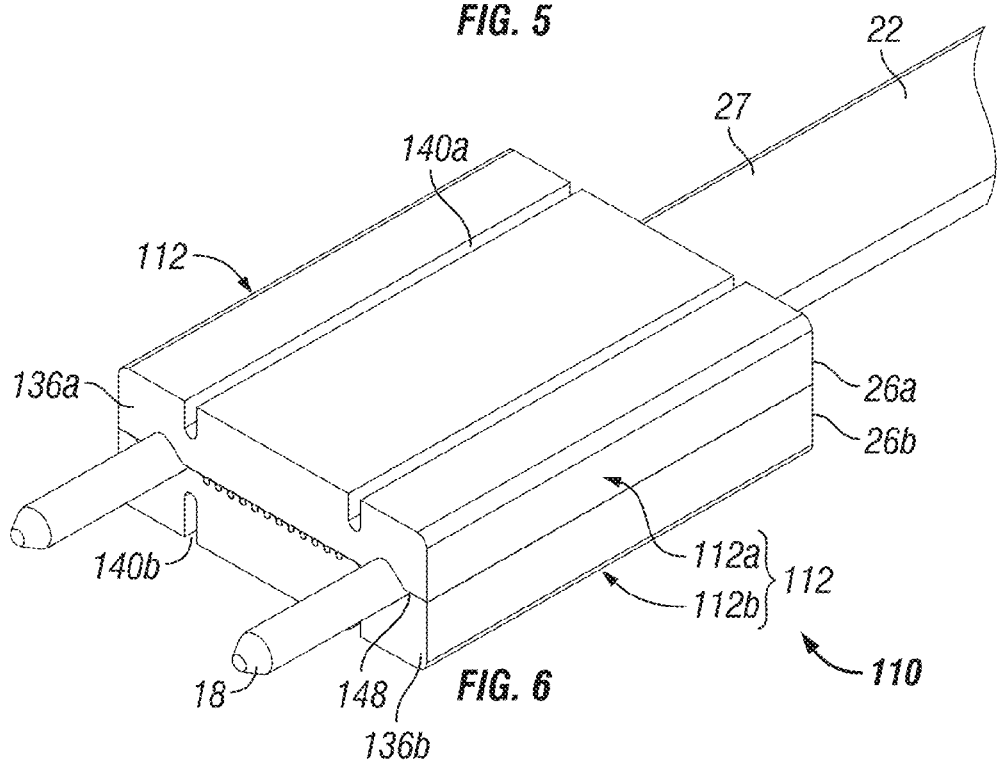
FIG. 6 illustrates a perspective view of an optical fiber connector in accordance with a further embodiment of the present invention.
Figure 7:
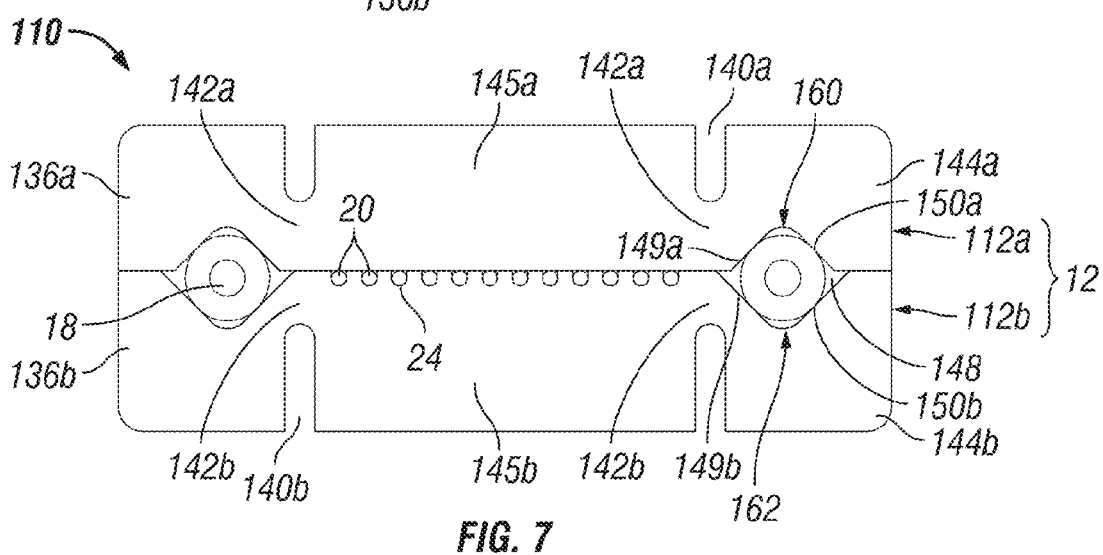
FIG. 7 is an end view of the optical fiber connector in FIG. 6.

In the embodiment of FIGS. 2-4, for each alignment pin 18, the compliant structure includes one flexure, providing a 3-point contact (sectional view) between the alignment pins and the ferrule halves. FIGS. 6 and 7 illustrate an alternate embodiment in which a compliant structure includes two flexures, providing a 4-point contact between the alignment pins and the ferrule halves. With the exception of the ferrule, the general structure of the optical fiber connector 110 in this embodiment is similar to the structure of the optical fiber connector 10 in the embodiment of FIGS. 2-4. The optical fiber connector 110 includes a ferrule 112 comprising two ferrule halves 112a and 112b, a ferrule housing and a cable boot (similar to those shown in FIG. 2 but are omitted from view for simplicity). The ferrule halves (112a, 112b) are provided with grooves 24 for supporting optical fibers 20. The general structure of the fiber grooves 24 is similar to the structure of the grooves in FIG. 2 (or the alternate embodiment of FIG. 5).

Comparing to the previous embodiment, additional slots are provided on the exterior of the second (lower) ferrule 112b. Specifically, near each lateral side 144a of the first ferrule halve 112a, a longitudinal narrow slot 140a is provided at the outside top side of the ferrule halve 112a, which extends from the head section 136a to the tail section 126a of the ferrule halve 112a. In addition, near each lateral side 144b of the second ferrule halve 112b, a longitudinal narrow slot 140b is provided at the outside underside side of the ferrule halve 112b, which extends from the head section 136b to the tail section 126b of the ferrule halve 112b. In the end view of FIG. 7, the slots 140a and 140b are vertical to the exterior surfaces of the ferrule halves 112a and 112b. The design considerations and purposes for the slots (140a, 140b) are similar to the slots 40 in the previous embodiment. In particular, the slots (140a, 140b) reduce the thickness of the top and second ferrule halves (112a, 112b) such that the side portions (144a, 144b) extend from the base portions (145a, 145b) of the first and second ferrule halves (112a, 112b) via cantilever links (142a, 142b) (i.e., the side portions (144a, 144b) are cantilevered structures with respect to the base portions (145a, 145b). In this embodiment, beveled surfaces 149a and 150a are defined by a V-groove 160 provided between the slot 140a and the side portion 144a in the first ferrule halve 112a, and beveled surfaces 149b and 150b are defined by a V-groove 162 provided between the slot 140b and the side portion 144b in the second ferrule halve 112b. The V-grooves (160, 162) extend through the ferrule halves (412a, 412b) from the head sections (436a, 436b) to the tail sections (426a, 426b). At each alignment pin region, the beveled surfaces 149a, 149b, 150a and 150b together define a space 148 for precisely locating an alignment pin 18 with respect to the optical fibers 20 (i.e., resulting in a 4-point contact). Upon insertion of an alignment pin 18 in the space 148, the cantilever links (142a, 142b) elastically deform to allow the side portions (144a, 144b) to displace slightly outwards away from the base portions (145a, 145b), thereby providing an inward bias to clamp the alignment pins 18 between the beveled surfaces of the ferrule halves (112a, 112b).

Given that the beveled surfaces 149a and 149b are closest to the fiber grooves 24, these beveled surfaces are essentially reference planes that can be precisely formed, while the cantilevered side portions (144a, 144b) are allowed certain flexibility in movement without affecting the precise reference planes.

In the previous two embodiments of FIGS. 2-7, the slots are provided on the exterior surfaces of the ferrule halves. Referring to FIGS. 8 and 9, alternatively, the slots may be provided on the interior surfaces of the ferrule halves. FIGS. 8 and 9 illustrate an embodiment of an optical fiber connector 210, in which a compliant structure includes two flexures defined by slots (240a, 240b) provided on the interior surfaces of the ferrules halve (212a, 212b), providing a 4-point contact between the alignment pins and the ferrule halves. With the exception of the ferrule, the general structure of the optical fiber connector 210 in this embodiment is similar to the structure of the optical fiber connector 110 in the embodiment of FIGS. 6-7. The optical fiber connector 210 includes a ferrule 212 comprising two ferrule halves 212a and 212b, a ferrule housing and a cable boot (similar to those shown in FIG. 2 but are omitted from view for simplicity). The ferrule halves (212a, 212b) are provided with grooves 24 for supporting optical fibers 20. The general structure of the fiber grooves 24 is similar to the structure of the grooves in FIG. 2 (or the alternate embodiment of FIG. 5).

Comparing to the previous embodiment of FIGS. 6-7, slots are provided on the interior or facing surfaces of the first and second ferrules (212a, 212b). Specifically, near each lateral side 244a of the first ferrule halve 212a, a longitudinal narrow slot 240a is provided at the inside underside of the ferrule halve 212a, which extends from the head section 236a to the tail section 226a of the top ferrule halve 212a. In addition, near each lateral side 244b of the second ferrule halve 212b, a longitudinal narrow slot 240b is provided at the inside topside of the lower ferrule halve 212b, which extends from the head section 236a to the tail section 226b of the ferrule halve 212b. In the end view of FIG. 9, the slots 240a and 240b are vertical to the interior surfaces of the ferrule halves 212a and 212b. Pin clamping beveled surfaces 249a, 249b, 250a, 250b are defined by V-grooves (260a, 260b) provided on the ferrule halves (212a, 212b), similar to the beveled surfaces 149a, 149b, 150a and 150b in the previous embodiment. The internal slots (240a, 240b) extend from the bottom of the V-grooves (260a, 260b) into the ferrules halves (212a, 212b).

The design considerations and purposes for the slots (240a, 240b) are similar to the slots 40 and 140 in the previous embodiments. In particular, the slots (240a, 240b) reduce the thickness of the top and second ferrule halves (212a, 212b) such that the side portions (244a, 244b) extend from the base portions (245a, 245b) of the first and second ferrule halves (212a, 212b) via cantilever links (242a, 242b) (i.e., the side portions (244a, 244b) are cantilevered structures with respect to the base portions (245a, 245b). At each alignment pin region, the beveled surfaces 249a, 249b, 250a and 250b together define a space 248 for precisely locating an alignment pin 18 with respect to the optical fibers 20 (i.e., resulting in a 4-point contact). Upon insertion of an alignment pin 18 in the space 248, the cantilever links (242a, 242b) elastically deform to allow the side portions (244a, 244b) to displace slightly outwards away from the base portions (245a, 245b), thereby providing an inward bias to clamp the alignment pins 18 between the beveled surfaces of the ferrule halves (212a, 212b).

Figure 10:
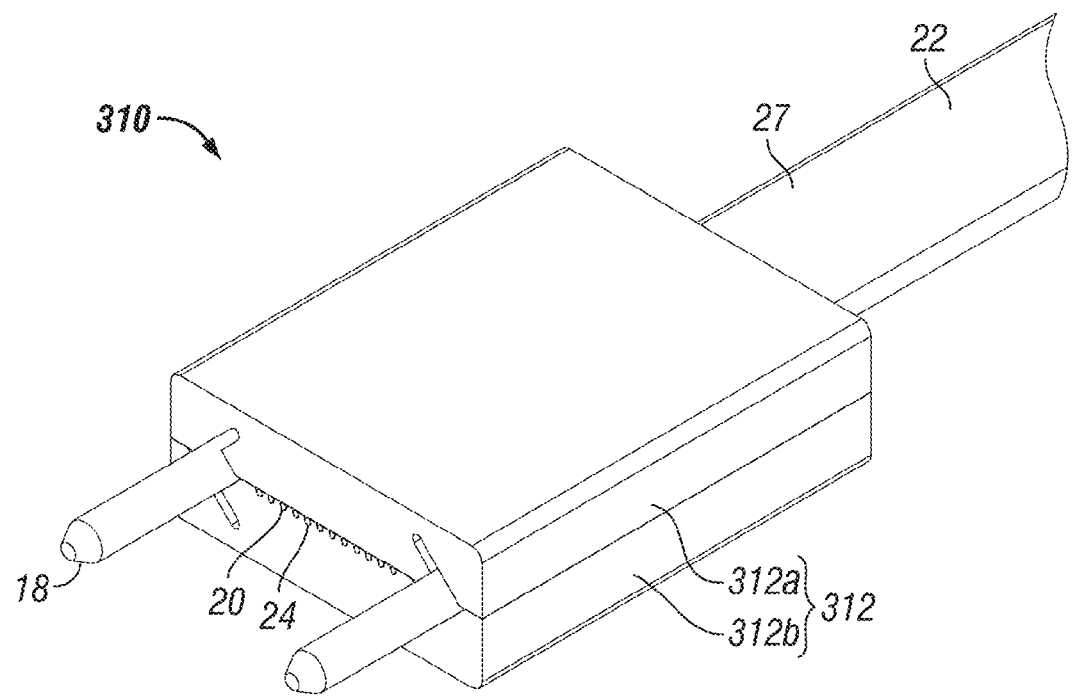
FIG. 10 illustrates a perspective view of an optical fiber connector in accordance with a further embodiment of the present invention.
Figure 11:
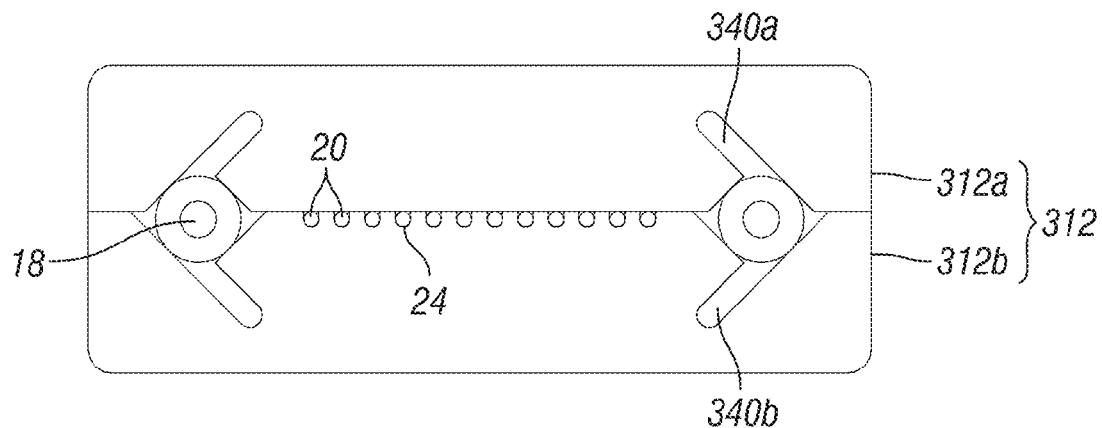
FIG. 11 is an end view of the optical fiber connector in FIG. 10.

FIGS. 10 and 11 illustrate an alternate embodiment of an optical fiber connector in which the compliant structure is a variation of the embodiment of FIGS. 8 and 9. With the exception of the ferrule, the general structure of the optical fiber connector 310 in this embodiment is similar to the structure of the optical fiber connector 210 in the embodiment of FIGS. 8-9. The optical fiber connector 310 includes a ferrule 312 comprising two ferrule halves 312a and 312b, a ferrule housing and a cable boot (similar to those shown in FIG. 2 but are omitted from view for simplicity). The ferrule halves (312a, 312b) are provided with grooves 24 for supporting optical fibers 20. The general structure of the fiber grooves 24 is similar to the structure of the grooves in FIG. 9. Comparing to FIG. 9, the difference in the embodiment of FIG. 11 is that the internal slots 340a and 340b are provided at an angle to the interior surfaces of the ferrule halves 312a and 312b, as shown in the end view of FIG. 11, instead of being vertical to the interior surfaces of the ferrule halves as in the case of FIG. 9.

Figure 12:
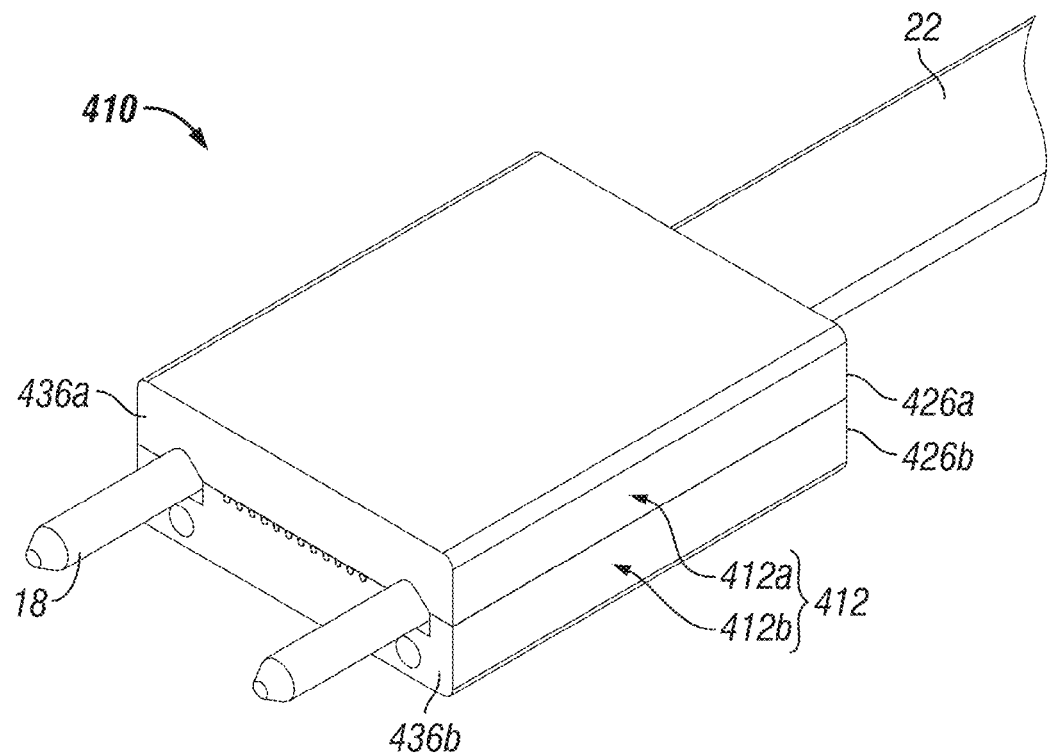
FIG. 12 illustrates a perspective view of an optical fiber connector in accordance with a further embodiment of the present invention.
Figure 13:
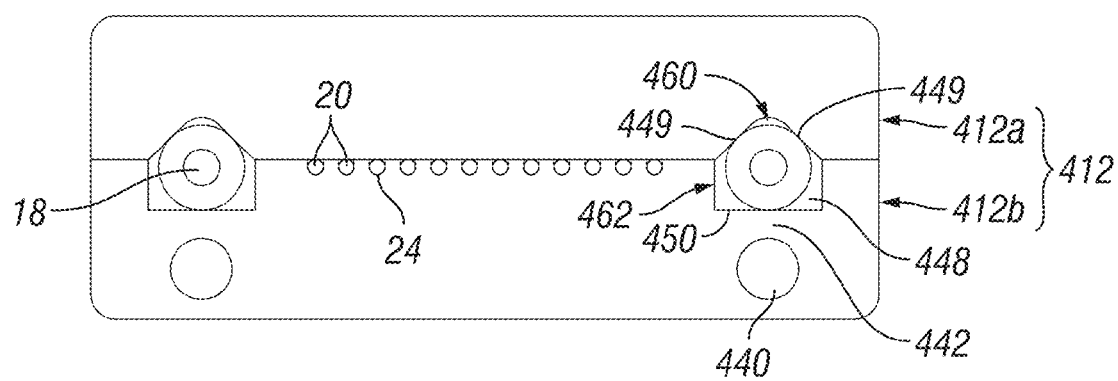
FIG. 13 is an end view of the optical fiber connector in FIG. 12.
Figure 14:
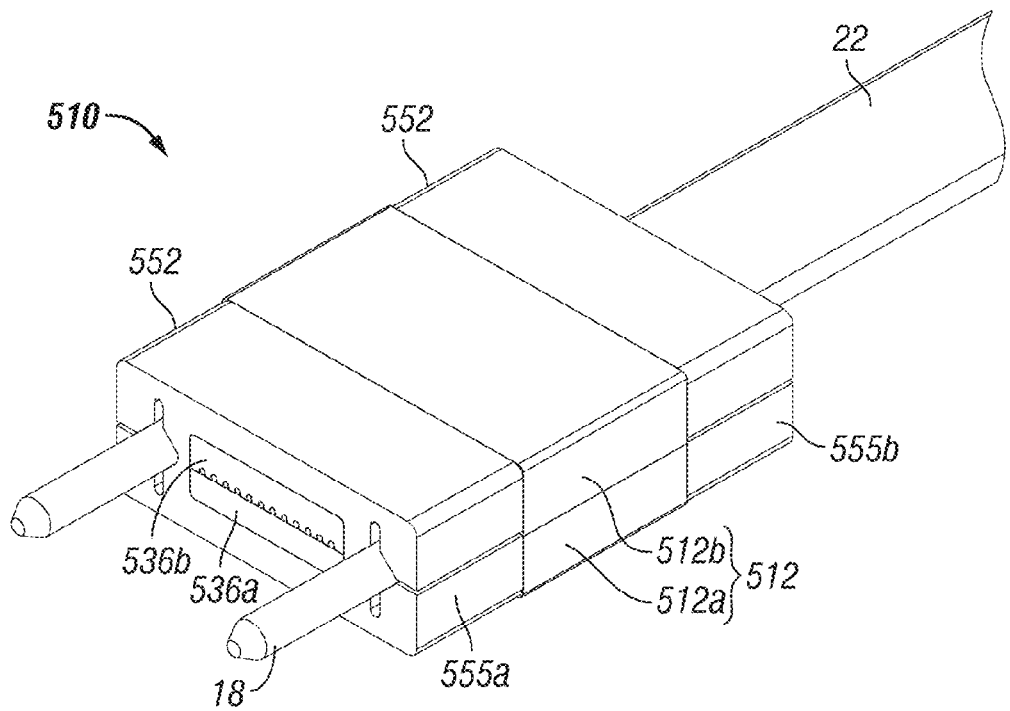
FIG. 14 illustrates a perspective view of an optical fiber connector in accordance with a further embodiment of the present invention.

FIGS. 12 and 13 illustrate an alternate embodiment of an optical fiber connector 410. In this embodiment, instead of slots defining flexure in the ferrule halves, a flexure is defined by a beam cantilevered above a space in a ferrule halve. With the exception of the ferrule, the general structure of the optical fiber connector 410 in this embodiment is similar to the structure of the optical fiber connector 10 in the embodiment of FIGS. 2-4. The optical fiber connector 410 includes a ferrule 412 comprising two ferrule halves 412a and 412b, a ferrule housing and a cable boot (similar to those shown in FIG. 2 but are omitted from view for simplicity). The ferrule halve 412 is provided with grooves 24 for supporting optical fibers 20. The general structure of the fiber grooves 24 is similar to the structure of the grooves in FIG. 3.

In this embodiment, the compliant structure is defined by a flexure that comprises a cantilevered beam 442 suspended above a space 440 provided in the lower (second) ferrule 412b. Pin clamping beveled surfaces 249 defined by a V-groove 460 are provided on the first ferrule halve 412a. A square bottom groove or square channel 462 is provided in the second ferrule plate 412b, defining a flexure surface 450. The V-grooves 460 and the square bottom grooves 462 extend through the ferrule halves (412a, 412b) from the head sections (436a, 436b) to the tail sections (426a, 426b). At each alignment pin region, the beveled surfaces 449 and the flexure surface 450 together define a space 448 for precisely locating an alignment pin 18 with respect to the optical fibers 20. The flexure surface 450 of the beam 442 and the beveled surfaces 449 defined a 3-point contact for the alignment pin 18. The V-groove 460 provides a precise reference location for the alignment pin. The beam 442 is allowed to elastically deform (flex slightly) and towards the space 440 below. Upon insertion of an alignment pin 18 in the space 448, the suspended beam 442 elastically deforms (flexes) slightly downwards and onto the space 440, thereby providing an upward bias to clamp the alignment pins 18 against the beveled surfaces of the V-groove 460 in the first ferrule halve 412a.

In the embodiment shown in FIG. 13, the compliant structures for the alignment pins 18 are defined by a combination of a V-groove provided on one ferrule halve and a square bottom groove provided on the other ferrule halve. The V-groove 460 can be precisely formed (e.g., by precision stamping), and the depth of the square bottom groove 462 can be precisely formed without requiring precision forming the walls of the square bottom groove 462. Variations in lateral dimension of the square groove 462 do not affect pin alignment. When the head sections (436a, 436b) are mated together, the combination of the precisely defined beveled surfaces 459 of the V-groove 460 and the precise depth of the flexure surface 450 square bottom groove 462 accurately and precisely position the alignment pins 18.

While the first ferrule 412a is provided with V-grooves 460 and the second ferrule 412b is provided with the cantilever beam (square channel 462 and space 440), it is well within the scope and spirit of the present invention to provide a V-groove and a cantilever beam in each ferrule halve (not shown). In an alternate embodiment (not shown), the ferrule halves may be made more symmetrical. Instead of only one ferrule halve providing grooves for optical fibers, each ferrule halve may be structured with a head section having semicircular cylindrical grooves for supporting optical fibers. The compliant structure for clamping the alignment pins may also be made symmetrical. Symmetrical ferrule halves would facilitate inventory management of identical components. However, the ferrule halves need not be identical, as long as they are capable of being mated together to support the optical fibers 20.

FIGS. 14-18 illustrate another embodiment of an optical fiber connector 510. In this embodiment, the ferrule 590 comprises a ferrule insert 512 having grooves 24 for supporting optical fibers 20, and a ferrule frame 552 that supports the ferrule insert 512 and alignment pins 18. In the illustrated embodiment, the ferrule insert 512 comprises a lower ferrule plate 512a without fiber grooves, and an upper ferrule plate 512b having grooves for optical fibers defined thereon (much like the ferrules 12a and 12b, or 412a and 412b, etc.). The ferrule insert 512 in this embodiment resembles the ferrules in the earlier embodiments, in that the ferrule inserts 512 are structured to clamp optical fibers 20 and the fiber cable 20 in a similar manner as the earlier described embodiments. The ferrule frame 552 comprises a front frame section 555a and a rear frame section 555b. In the illustrated embodiment, the frame sections 555a and 555b share similar structures. The head section (536a, 536b) of the ferrule plates (512a, 512b) are mated and inserted into an opening 565a in the front frame section 555a and the tail section (526a, 526b) of the ferrule plates (512a, 512b) are inserted into an opening 565b in the rear frame section 555b to complete the ferrule structure.

Figure 15:
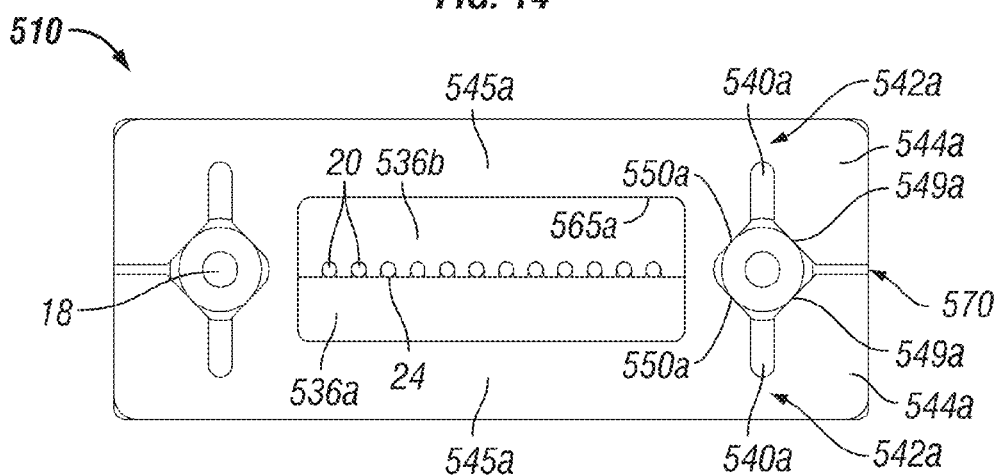
FIG. 15 is an end view of the optical fiber connector in FIG. 14.
Figure 16:
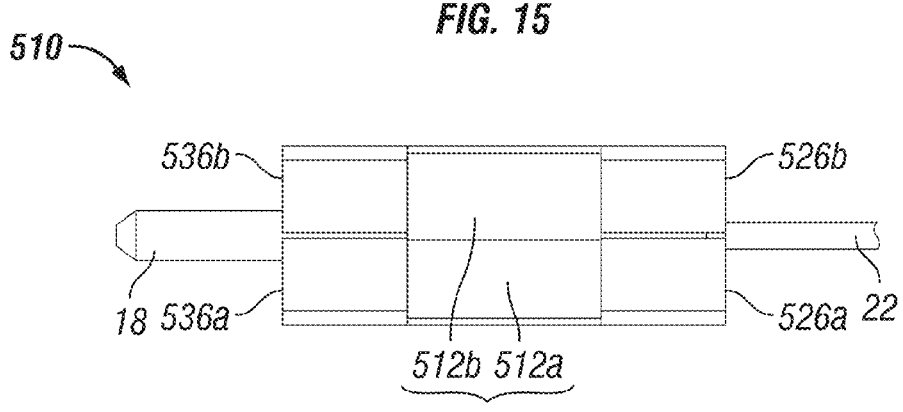
FIG. 16 is a side view of the optical fiber connector in FIG. 14.
Figure 17:
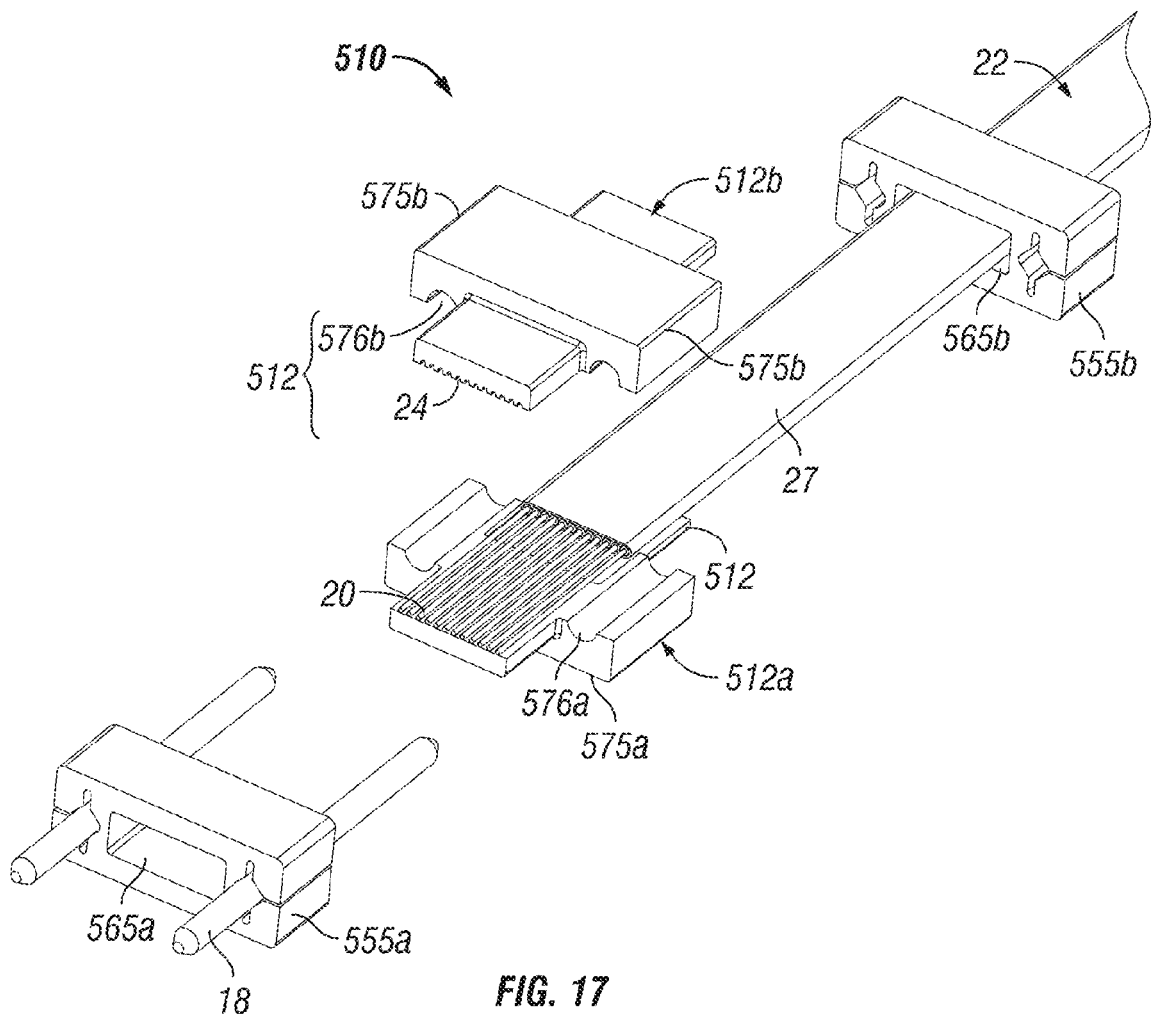
FIG. 17 is an exploded view of the optical fiber connector in FIG. 14.
Figure 18:
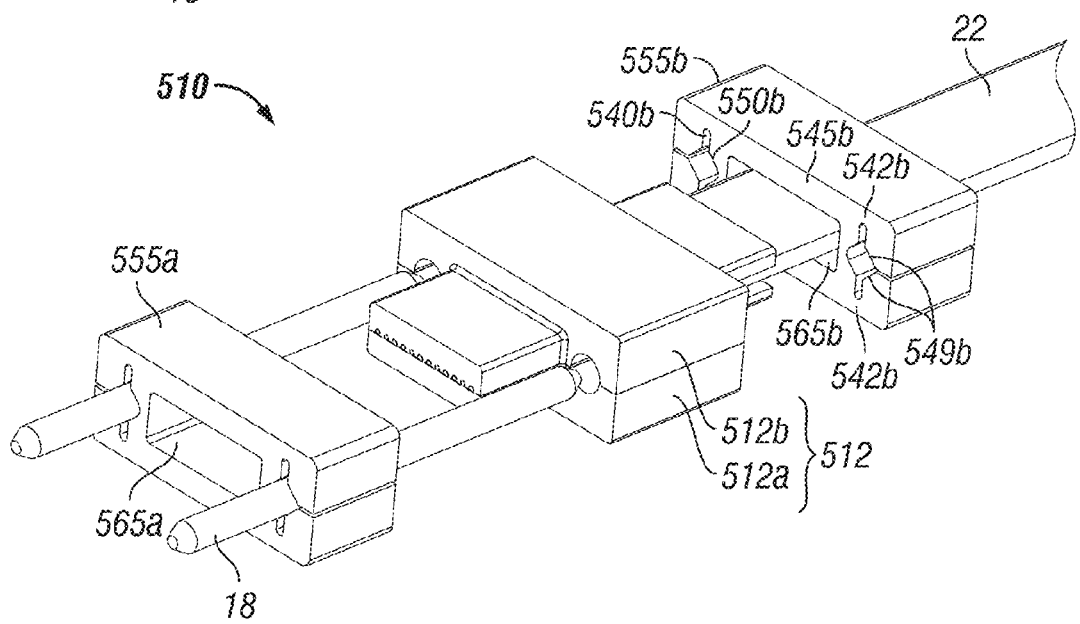
FIG. 18 is a partially assembled view of the optical fiber connector in FIG. 14.

The compliant pin clamping structure is provided on the ferrule frame 552, which supports the alignment pins 18. Specifically, flexures are provided at the front frame section 555a and the rear frame section 555b. Referring to FIG. 15, the compliant structure is similar to the internally slotted compliant structure on the ferrule 212 shown in FIG. 9, with the exceptions that the frame sections (555a, 555b) are each unitary or one-piece and are not provided with fiber grooves in this embodiment. The resultant compliant structure resembles a C-shaped structure, having a slit opening 570. Pin clamping beveled surfaces 549a, 549b, 550a, 550b are defined by V-grooves (560a, 560b) provided on the frame section (555a, 555b), similar to the beveled surfaces 249a, 249b, 250a and 250b in the earlier described embodiment. The internal slots (540a, 540b) extend from the bottom of the V-grooves (560a, 560b) into the frame sections (555, 556). The design considerations and purposes for the slots (540a, 540b) are similar to the slots 40, 140 and 240 for the ferrules described in the earlier embodiments. In particular, the slots (540a, 540b) reduce the thickness of the frame sections (555a, 555b) such that the side portions (544a, 544b) extend from the base portions (545a, 545b) of the frame sections (555a, 555b) via cantilever links (542a, 542b) (i.e., the side portions (544a, 544b) are cantilevered structures with respect to the base portions (545a, 545b). At each alignment pin region, the beveled surfaces (549a and 550a, and 549b and 550b) together define a space (548a, 548b) for precisely locating an alignment pin 18 with respect to the optical fibers 20 (i.e., resulting in a 4-point contact). The alignment pins are inserted into compliant structures provided on the front and rear frame sections (55a, 555b). Upon insertion of an alignment pin 18 in the space (548a, 548b), the cantilever links (542a, 542b) elastically deform to allow the side portions (544a, 544b) to displace slightly outwards away from the base portions (545a, 545b), thereby providing an inward bias to clamp the alignment pins 18 between the beveled surfaces of the frame sections (555a, 555b). In the illustrated embodiment, the ferrule plates (512a, 512b) each includes a flange (575a, 575b) extending from each side, on which a groove (576a, 576b) is provided. When the ferrule plates (512a, 512b) are mated together, the grooves (576a, 576b) form guide holes for guiding the alignment pins from the front frame section 555a to the rear frame section 555b.

Figure 19:
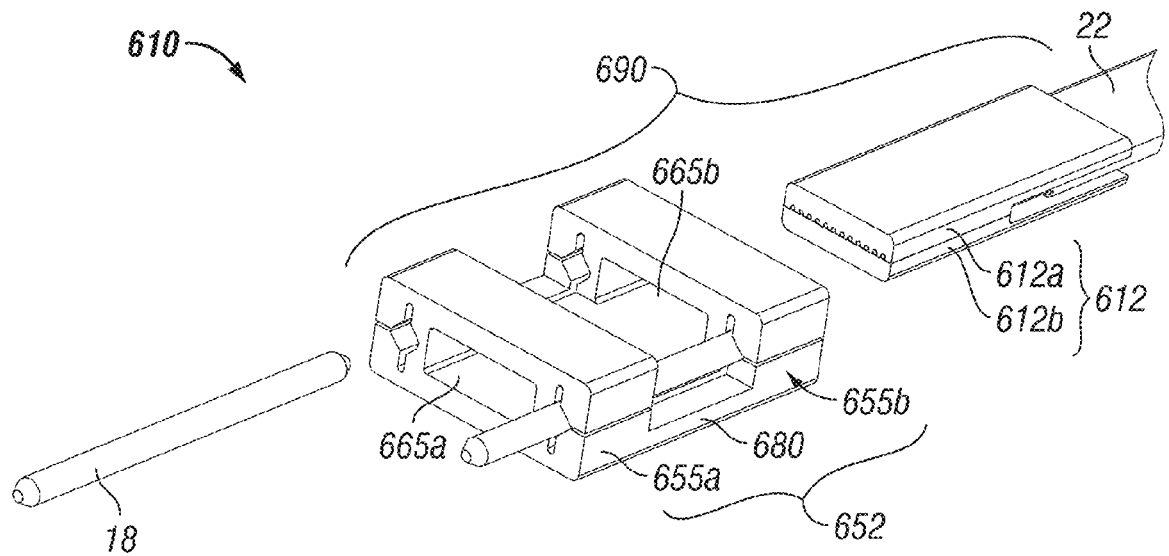
FIG. 19 is a partially assembled view of a variation of optical fiber connector of the embodiment of FIG. 14.
Figure 20:
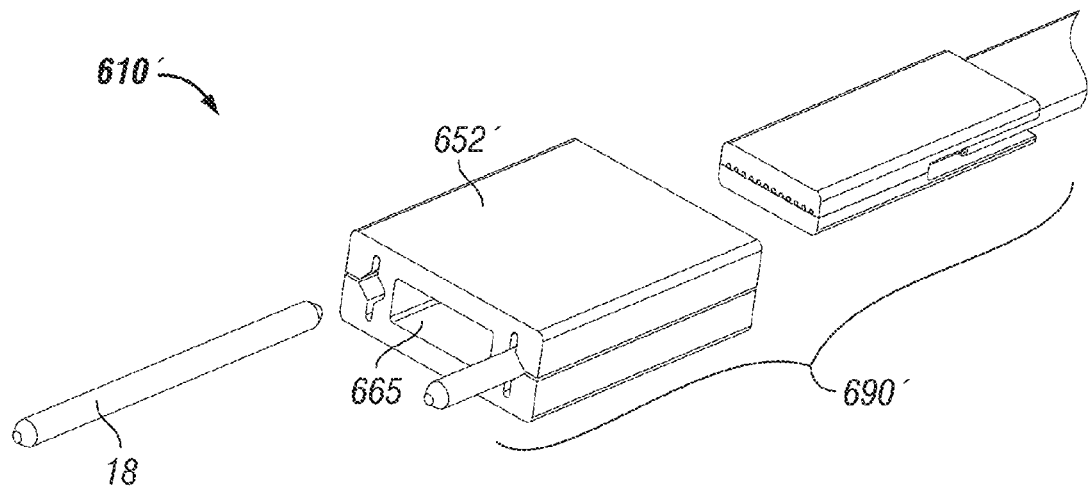
FIG. 20 is a partially assembled view of another variation of optical fiber connector of the embodiment of FIG. 14.
Figure 21:
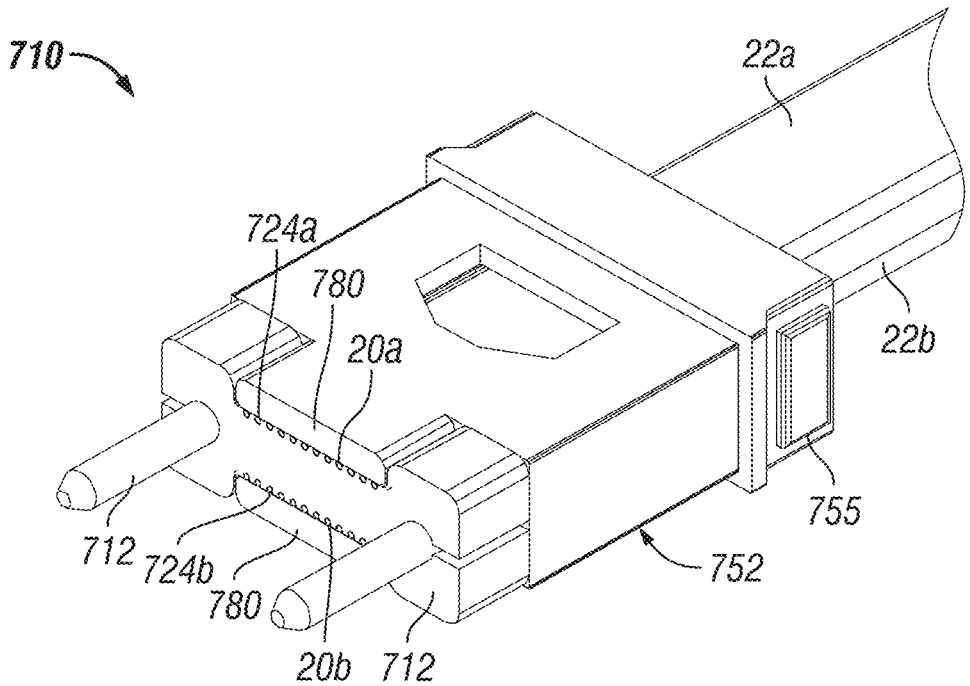
FIG. 21 illustrates a perspective view of an optical fiber connector in accordance with a further embodiment of the present invention.

FIGS. 19 and 20 illustrate alternate embodiments in which the ferrule frame may be a single, unitary structure, on which the ferrule insert is supported. In the embodiment of FIG. 19, the optical fiber connector 610 includes a ferrule 690, which comprises a frame 652 and a ferrule insert 612 that comprises ferrule plates (612a, 612b). The ferrule plates together form a generally flat cylindrical profile, which can be inserted through the openings 665a and 665b in the front and rear frame sections 655a and 655b. In this embodiment, the frame 652 is a unitary piece, including front and rear frame sections (655a, 655b) connected by a bridge 680. The bridge 680 may extend between the front and rear frame sections across the entire width of the frame 652.

In the embodiment of FIG. 20, the optical fiber connector 610' comprises a ferrule 690', which comprises a ferrule frame 652' and a similar ferrule insert 612 that comprises ferrule plates (612a, 612b). The ferrule plates together form a generally flat cylindrical profile, which can be inserted through the opening 665 in the frame 652'. Unlike the previous embodiment, the entire ferrule frame 662' is one section. A similar compliant structure is provided, which extends from the front to the rear of the frame 652'. The ferrule frame 652' is provided with compliant structures, similar to that disclosed in connection with the previous embodiment.

Figure 25:
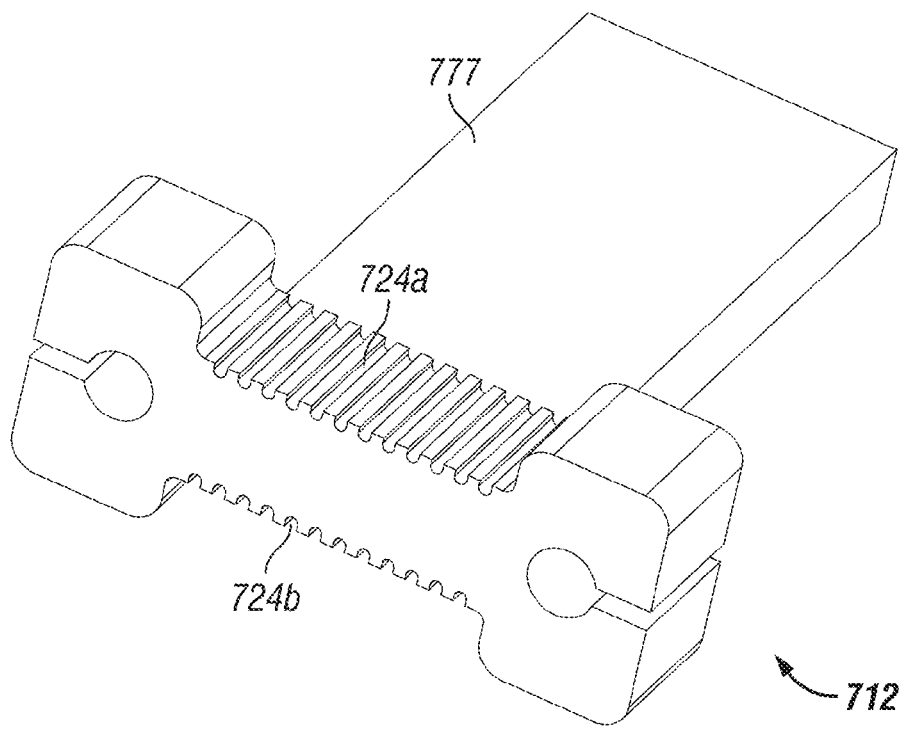
FIG. 25 illustrates a perspective view of a ferrule insert of the optical fiber connector in FIG. 21.

FIGS. 21 to 25 illustrate another embodiment of an optical fiber connector 710. It comprises a ferrule 790, which comprises a ferrule frame 552 and a ferrule insert 512 that comprises an offset structure (resembling the shape of a "dogbone") provided with optical fiber grooves 24 at its perimeter. Referring to FIG. 25, a stub 777 extends from the center of ferrule insert 512 towards the frame base 755. In the illustrated embodiment, fiber grooves (24a, 24b) are provided at opposite surfaces at the perimeter of the offset structure, which can accommodate optical fibers (20a, 20b) from two fiber cables (22a, 22b).

Figure 23:
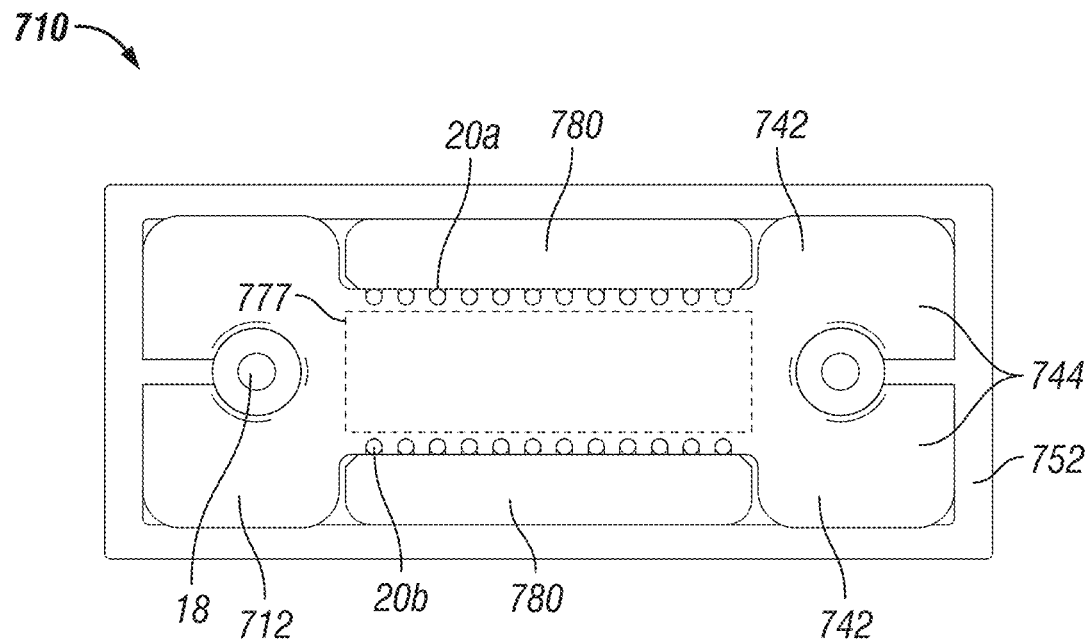
FIG. 23 is an end view of the optical fiber connector in FIG. 21.
Figure 24:
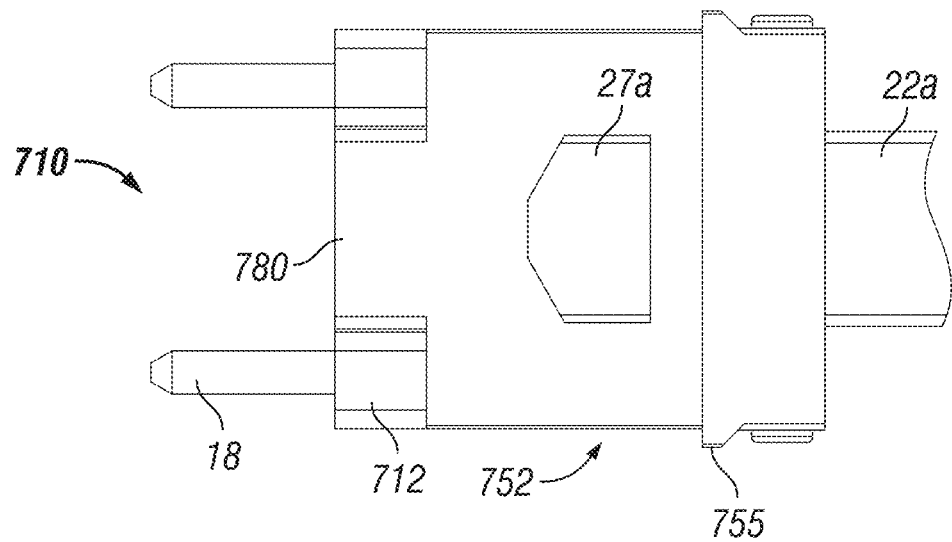
FIG. 24 is top view of the optical fiber connector in FIG. 21.

Referring to FIG. 23, a compliant structure is provided at two ends of the ferrule insert 512, which supports the alignment pins 18. In particular, the compliant structure comprises a C-shaped flexure, having fingers 744 extending around the alignment pins 18 from the base portion 745. The fingers 744 are able to flex at the flexure links 742, upon insertion of alignment pins. In this embodiment, the compliant structure provides essentially multiple points of contact on the alignment pin, given its partial circular opening 798 defined in the compliant structure.

The ferrule frame 752 has flat cover portions 780 that extend from the base 755 of the ferrule frame 752. The cover portions 780 covers at least the fiber grooves (724a, 724b) on the ferrule insert 712. The cover portions 780 and the grooves (724a, 724b) resemble the ferrule base portion 45 and grooves 24 for the ferrule 12 discussed in connections with FIG. 3. Similar considerations apply here for the present embodiment, with respect to providing precise support to the optical fibers (22a, 22b) using grooves (24a, 24b). In particular, the grooves (724a, 724b) can take the same structure as grooves 24 on the surface of ferrule halve 12b in the embodiment of FIG. 3, or the grooves in the embodiments of FIG. 5.

Figure 22:
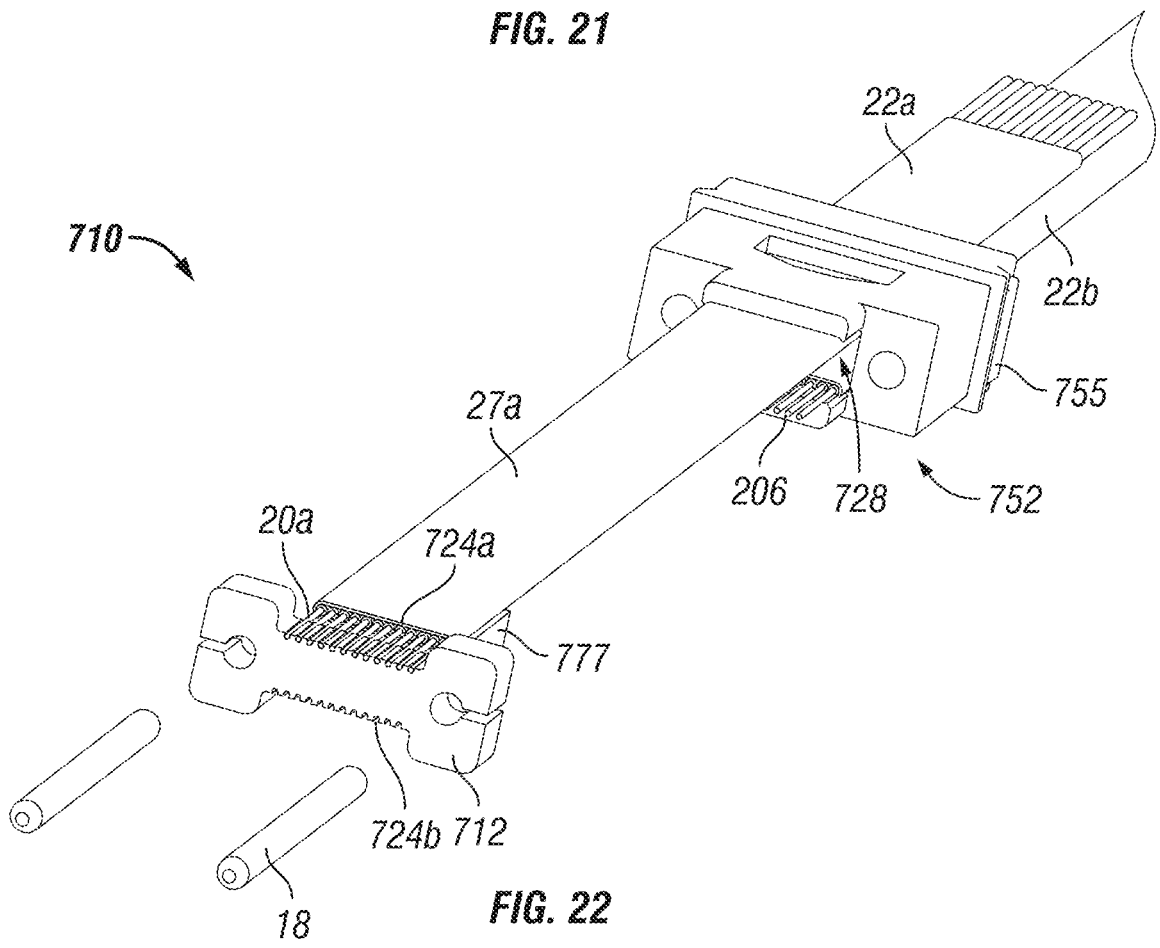
FIG. 22 is partially assembled view of the optical fiber assembly in FIG. 21.

Referring to FIG. 22, to assemble the ferrule insert 512 to the ferrule frame 752, the jackets (27a, 27b) of the optical fibers (22a, 22b) are inserted through the space 728 defined between the cover portions 780 in the frame base 755. The bare optical fibers (20a, 20b) are inserted into the grooves (24a, 24b) on the ferrule insert 712. The fiber jackets (27a, 27b) are rested against the stub 777 behind the ferrule insert 512, and the ferrule insert 512 is inserted into the space 728 defined between the two cover portions 780, to complete the ferrule structure illustrated in FIG. 21.

Figure 26:
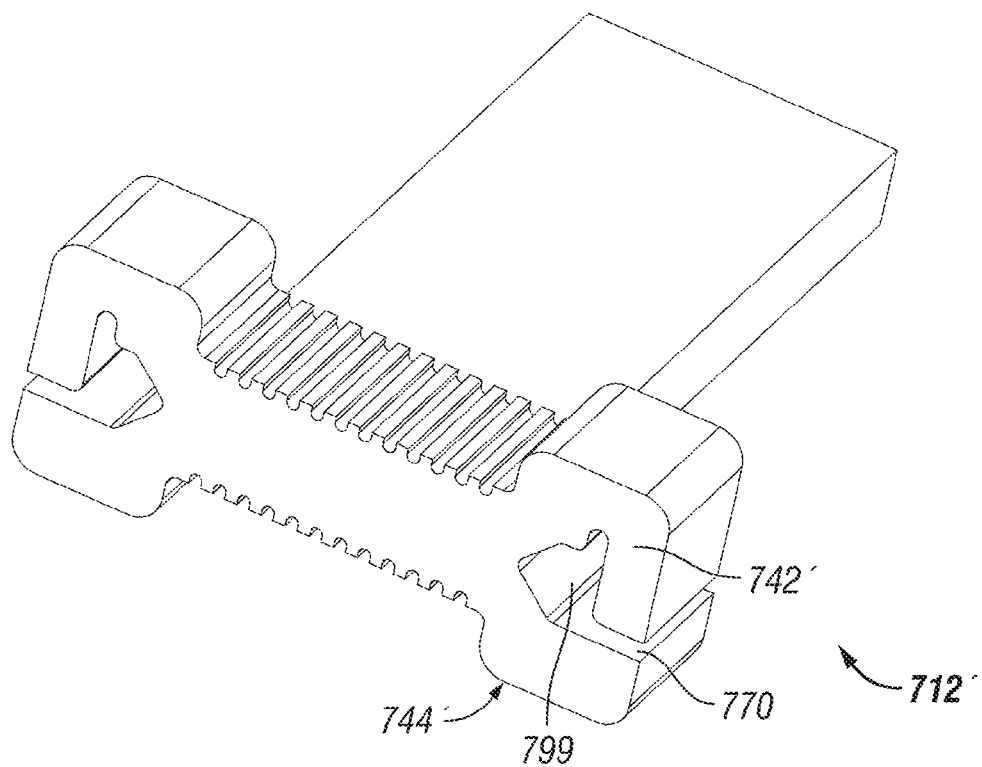
FIG. 26 illustrates a perspective view of a ferrule insert in accordance with another embodiment of the present invention.
Figure 27:
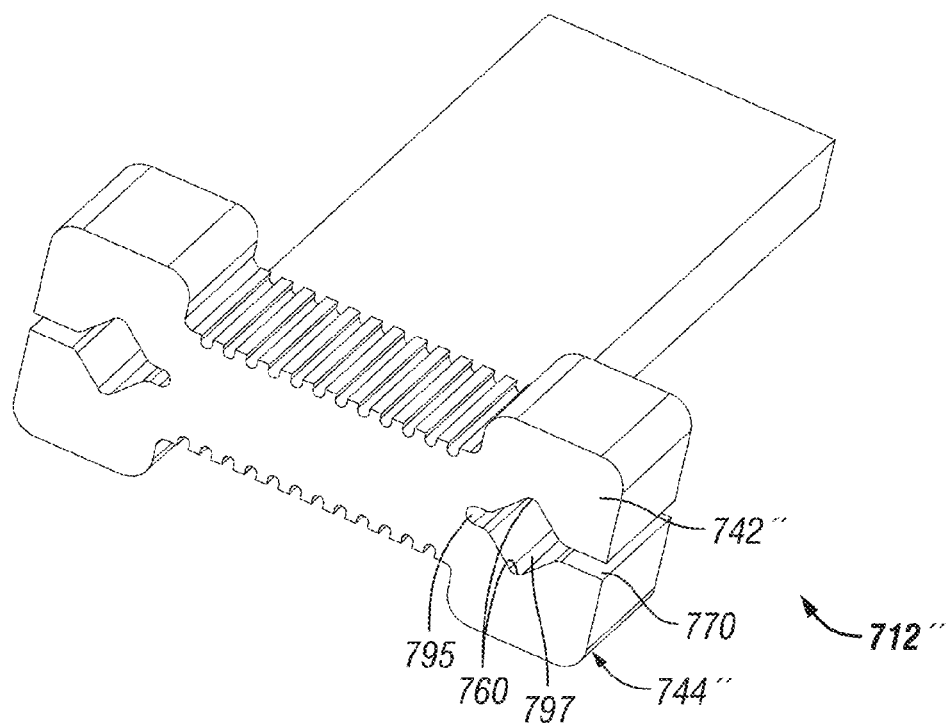
FIG. 27 illustrates a perspective view of a ferrule insert in accordance with further embodiment of the present invention.
Figure 28:
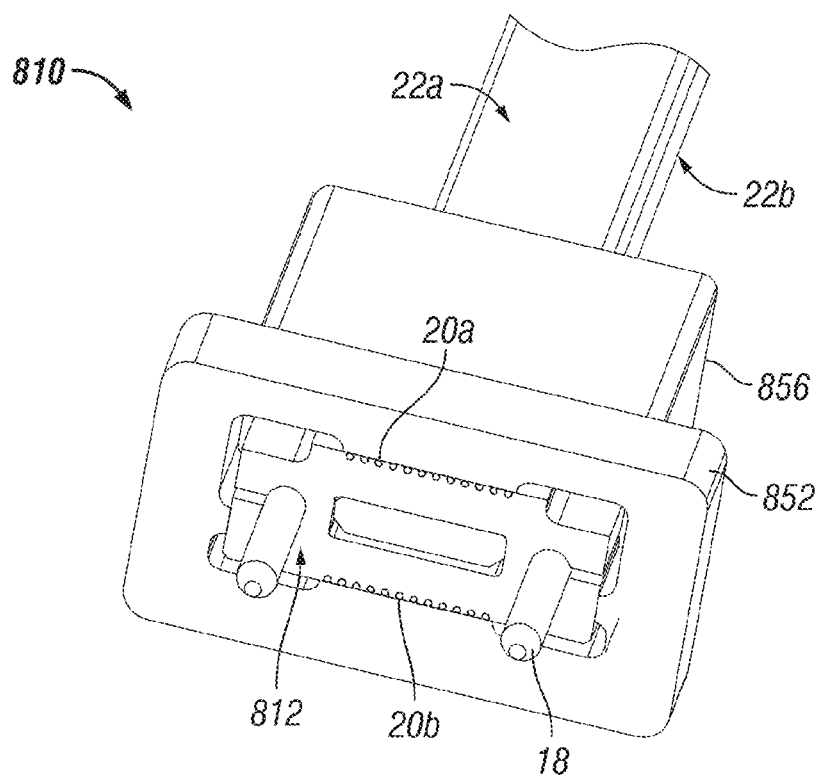
FIG. 28 illustrates a perspective view of an optical fiber connector in accordance with yet a further embodiment of the present invention.
Figure 29:
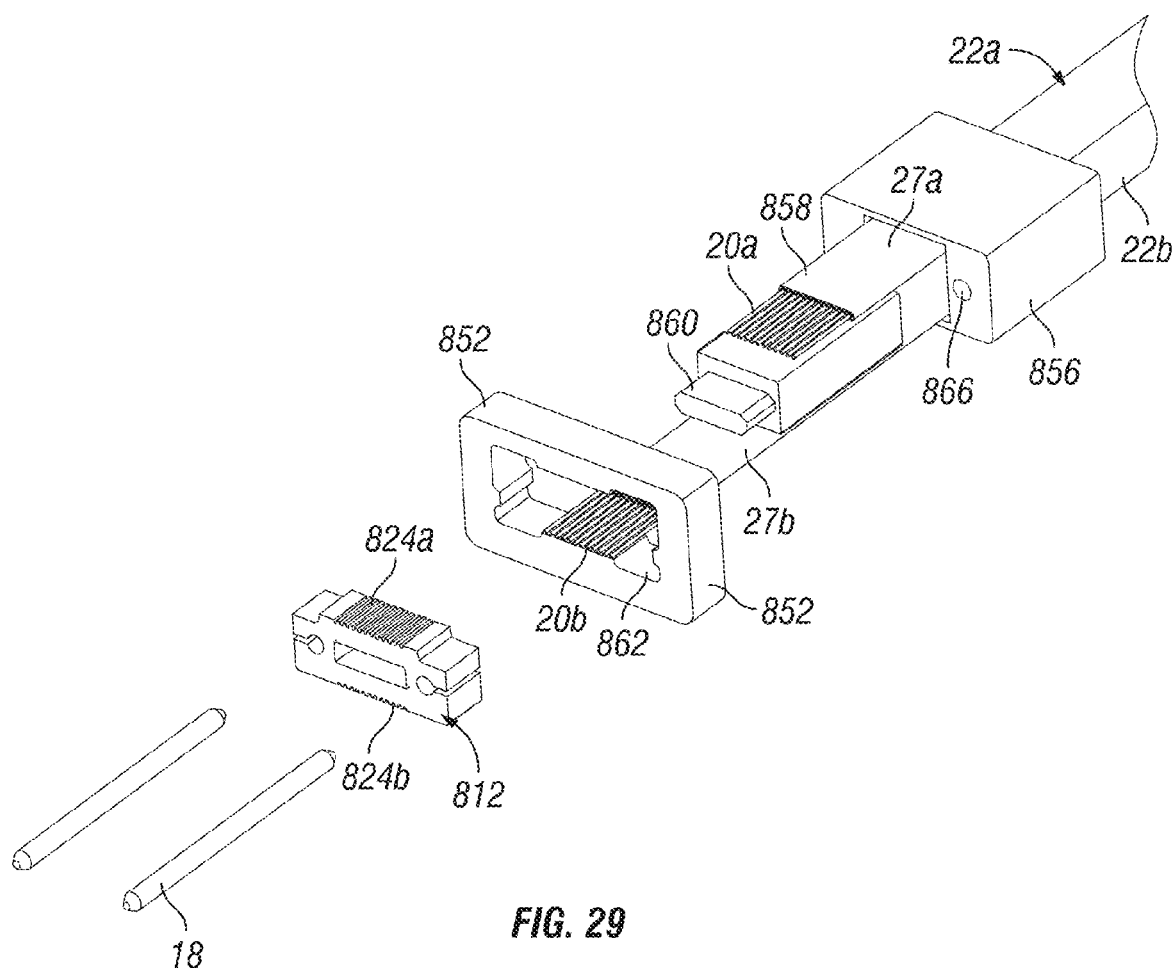
FIG. 29 is an exploded view of the optical fiber connector in FIG. 28.

FIGS. 26 and 27 illustrate variations of the compliant structures for ferrule inserts as compared to the ferrule insert shown in FIG. 25. In FIG. 26, the compliant structure 744' is similar to the compliant structure on the ferrule 12 shown in FIG. 3, with the exceptions that the frame insert 712' is a one-piece structure and is provided with fiber grooves on surfaces at the perimeter of the ferrule insert 712' in this embodiment. The resultant compliant structure 744' resembles a C-shaped structure, having a slit opening 770. Similar design considerations and objectives are applicable to the present embodiment. This embodiment provides essentially a 3-point contact on the alignment pin within the opening 799 (two beveled surfaces and the inside surface of finer 742'.

In FIG. 27, the compliant structure 744" resembles the structure shown in FIG. 25, with the exceptions that V-grooves 760 are provided instead of the circular grooves in the FIG. 25, and a small slot 795 is provided in line with the slit 770 which facilitates flexing of the fingers 742". This embodiment provides a 4-point contact within the opening 797.

Figure 30:
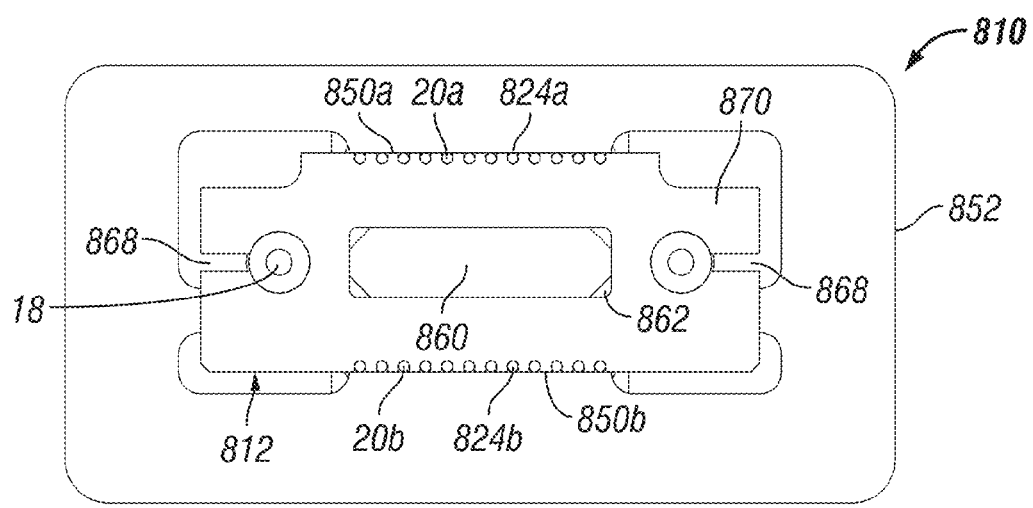
FIG. 30 is an end view of the optical fiber connector in FIG. 28.
Figure 31:
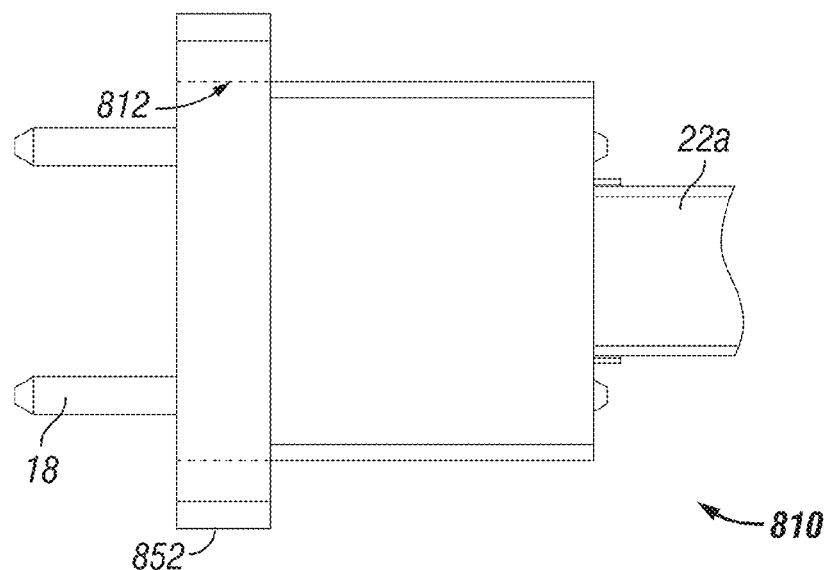
FIG. 31 is a top view of the optical fiber connector in FIG. 28.
Figure 32:
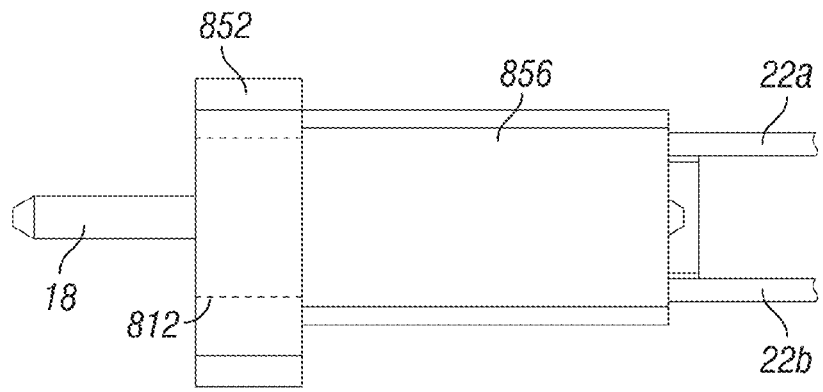
FIG. 32 is a side view of the optical fiber connector in FIG. 28.

In another embodiment, a ferrule frame surrounds the perimeter of the ferrule insert. FIGS. 28-32 illustrate a high density optical fiber connector in accordance with a further embodiment of the present invention. In this embodiment, the optical fiber connector 810 includes a single piece ferrule 812, a frame 852, a ferrule housing and a cable boot (similar to those shown in FIG. 2 but are omitted from view for simplicity). In this embodiment, the ferrule 812 is configured to align the terminating optical fibers (20a, 20b) of ribbon cables (22a, 22b) in two rows in two parallel planes. The optical fibers 20a and 20b alternately extend from the different optical fiber cables 22a and 22b. As illustrated in FIG. 30, the terminating optical fibers 20a of the first fiber cable 22a are supported on grooves 824a provided on the top surface at the perimeter of the ferrule 812, and the terminating optical fibers 20b of the second fiber cable 22b are supported on grooves 824b provided on the bottom surface at the perimeter of the ferrule 812. The grooves (824a, 824b) can take the same structure as grooves 24 on the surfaces of ferrule halves 12b in the embodiment of FIG. 3, or the grooves in the embodiments of FIG. 5.

Each groove (824a, 824b) completely receives the corresponding optical fiber (20a, 20b). The frame 852 has inside flat sections (850a, 850b) facing the grooves (824a, 824b) when the ferrule 812 is inserted into the frame 852. The flat sections (850a, 850b) completely cover the grooves (824a, 824b). Given that the optical fibers (20a, 20b) are completely retained in the grooves (824a, 824b), the optical fibers (20a, 20b) are positioned with precision in the ferrule halves (12a, 12b) by the grooves (824a, 824b). The position and orientation of the optical fibers (20a, 20b) is set by the location and parallelism of the grooves (824a, 824b). Accordingly, the relative locations (e.g., spacing) of the optical fibers (20a, 20b) in the ferrule halves (12a, 12b) are precisely maintained within the ferrule, e.g., for alignment to fibers in an opposing optical fiber connector (which has a female structure to receive the alignment pins 18). No complementary ferrule or frame would be required to securely and precisely position the fibers within the optical fiber connector 810. Even though the frame 852 does not serve any alignment function or effective support to accurately position the fibers (20a, 20b) in the ferrule 812, however, the frame 852 serves to cover the grooves (824a, 824b) to prevent accidental dislodgment of the optical fibers.

The jackets (27a, 27b) of the fiber cables (22a, 22b) are inserted through openings in the strain relief anchor 856, and are supported on the extension 858. The extension 858 has a stub 860 extending into a central opening 862 in the ferrule 812. Alignment pins 18 are inserted into holes 864 provided in the ferrule 812, extending into holes 866 provided in the strain relief anchor 856. The holes 864 are defined by a split 868 provided at each edge of the ferrule 812. The thickness of the material of at least one prong 870 defining the split is made thinner, to facilitate flexing of the prong 870. A flexure is thus formed, which defines a compliant structure that clamps the alignment pins to accurately and precisely locate the alignment pins for alignment to another complementary optical fiber connector.

While the frame 852 is shown to surround the perimeter of the ferrule 812 in the illustrated embodiment, a frame may be structured to cover the grooves (824a, 824b) without surrounding the perimeter of the ferrule 812. For example, a frame may be structured to be a partial ring (e.g., C-shaped) in the end view of FIG. 30 instead of a complete ring (not shown). Alternatively, the frame 852 may be omitted, and the anchor 856 may be provided with two extending flat fingers covering the grooves (824a, 824b) on the top and bottom surface of the ferrule 812 (not shown).

As were in the case of the previous embodiments, the ferrule 812, frame 852 and/or the anchor 856 may be made of metal and formed by high-throughput stamping and/or extrusion processes.

The high density ferrule structure is the subject matter of a separate U.S. patent application concurrently filed herewith (U.S. patent application Ser. No. 13/650,099). Such application is incorporated by reference as if fully set forth herein.

For the above described embodiments, the ferrules may be made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass). In another aspect of the present invention, the inventive ferrules are precision formed by high throughput processes, such as stamping and extrusion.

The ferrule in accordance with the present invention overcomes many of the deficiencies of the prior art. The compliant clamping structure makes it possible for the alignment pins to be inserted into the holes with no clearance, thus not requiring epoxy to fill any clearance between the holes and the alignment pins. By not having any clearance between the grooves in the ferrule and the fibers and alignment pins which would otherwise lead to movements between the parts, the alignment pins and the fibers can be more accurately located relative to each other. The spacing of the fibers and pins can be better maintained under changes in environmental conditions, for example, as the ferrule can accommodate more dimensional variations without affecting specified alignment tolerances. The optical fiber connector thus formed results in low insertion loss and low return loss. The ferrule configuration also allows ease of attaching terminating fiber ends to the ferrules, compared to threading epoxy coated fibers through holes in prior art ferrules. Without using epoxy, the reliability of the optical fiber connector is not affected by any aging/creeping of epoxy material. By selecting appropriate materials for the ferrule, the performance of the optical fiber connector is less sensitive to thermal variations. The open structure of the ferrule lends itself to mass production processes such as stamping and extrusion, which are low cost, high throughput processes.

\* \* \*

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A ferrule for supporting an optical fiber in an optical fiber connector, comprising:
a body having a surface with at least an optical fiber groove defined thereon to support the optical fiber; and
a compliant structure defined in the body for clamping an alignment pin, wherein the compliant structure comprises a flexure defined by a slot defined in the body, wherein the slot extends in a direction towards the alignment pin at an angle to the surface of the body of the ferrule where the optical fiber groove is defined, wherein one end of the slot terminates with an opening at the surface of the body of the ferrule on which the optical fiber groove is also defined, and wherein surfaces adjacent each side of the opening of the slot directly contact the alignment pin under bias of the flexure.

2. The ferrule as in claim 1, wherein the ferrule further comprises two opposing ferrule halves having opposing mating surfaces, wherein at least one of the ferrule halves comprises the body that has the optical fiber groove defined thereon to support the optical fiber.

3. The ferrule as in claim 2, wherein the angle of the slot is perpendicular to the opposing mating surfaces.

4. The ferrule as in claim 2, wherein the angle of the slot is not perpendicular to the opposing mating surfaces.

5. A ferrule for supporting an optical fiber in an optical fiber connector, comprising:
a ferrule insert having a surface with at least an optical fiber groove defined thereon to support the optical fiber; and
a ferrule frame having a body surrounding the ferrule insert and having a compliant structure defined in the body for clamping an alignment pin, wherein the compliant structure comprises a flexure defined by a slot defined in the body, wherein the slot extends in a direction towards the alignment pin at an angle to the surface of the ferrule insert defining the optical fiber groove, wherein one end of the slot terminates with an opening, and wherein surfaces adjacent each side of the opening of the slot directly contact the alignment pin under bias of the flexure without the alignment pin being received within the slot.

6. The ferrule as in claim 5, wherein the ferrule insert comprises two opposing ferrule plates having opposing mating surfaces, wherein at least one of the ferrule plates has the optical fiber groove defined thereon to support the optical fiber.

7. The ferrule as in claim 5, wherein the ferrule frame comprises a front frame section and a rear frame section, wherein the front frame section is attached to a front end of the ferrule insert and the rear frame section is attached to a rear end of the ferrule insert.

8. The ferrule as in claim 7, wherein the front and rear frame sections each includes the compliant structure, and wherein the alignment pin is inserted into the compliant structures provided on the front and rear frame sections.

9. The ferrule as in claim 5, wherein the ferrule frame has a single, unitary structure, by which the ferrule insert is supported.

10. The ferrule as in claim 5, wherein the angle of the slot is perpendicular to the surface of the ferrule insert defining the optical fiber groove.

11. The ferrule as in claim 5, wherein the angle of the slot is not perpendicular to the surface of the ferrule insert defining the optical fiber groove.

12. The ferrule as in claim 5, wherein the compliant structure of the ferrule frame is precision formed by stamping a body of metal material.

13. The ferrule as in claim 6, wherein the optical fiber groove in the ferrule insert is precision formed by stamping a body of metal material.

14. The ferrule as in claim 1, wherein the compliant structure is precision formed by stamping a body of metal material.

15. The ferrule as in claim 14, wherein the optical fiber groove is also precision formed by stamping the body of metal material.

16. The ferrule as in claim 1, wherein the optical fiber groove is precision formed by stamping the body of metal material.

17. The ferrule as in claim 1, wherein beveled surfaces are defined adjacent each side of the opening of the slot, wherein the beveled surfaces directly contact the alignment pin.

18. The ferrule as in claim 5, wherein beveled surfaces are defined adjacent each side of the opening of the slot, wherein the beveled surfaces directly contact the alignment pin.

19. The ferrule as in claim 5, wherein the ferrule insert is supported inside an opening provided in the ferrule frame.

20. The ferrule as in claim 19, wherein the ferrule frame comprises a front frame section having a first opening and a rear frame section having second opening, wherein a front end of the ferrule insert is supported inside the first opening, and a rear end of the ferrule insert is supported inside the second opening, wherein the front and rear frame sections each includes the compliant structure, and wherein the alignment pin is inserted into the compliant structures provided on the front and rear frame sections.

* * * * *